US006944818B2

(12) United States Patent
Newman et al.

(10) Patent No.: US 6,944,818 B2
(45) Date of Patent: Sep. 13, 2005

(54) METHOD AND APPARATUS FOR THE VIEWING AND EXPLORATION OF THE CONTENT OF HIERARCHICAL INFORMATION

(75) Inventors: Paula S. Newman, Los Altos, CA (US); Stuart K. Card, Los Altos Hills, CA (US)

(73) Assignee: Xerox Corporation, Stamford, CT (US)

( * ) Notice: Subject to any disclaimer, the term of this patent is extended or adjusted under 35 U.S.C. 154(b) by 743 days.

(21) Appl. No.: 09/954,530

(22) Filed: Sep. 10, 2001

(65) Prior Publication Data

US 2004/0205536 A1 Oct. 14, 2004

(51) Int. Cl.⁷ ............................................. G06F 15/00
(52) U.S. Cl. ...................... 715/517; 715/514; 715/526; 345/619
(58) Field of Search ................................ 715/517, 526, 715/514; 345/619

(56) References Cited

U.S. PATENT DOCUMENTS 6,085,202 A     7/2000   Rao et al. .................... 707/509
  6,496,842 B1 * 12/2002   Lyness ........................ 715/514
  6,691,282 B1 *  2/2004   Rochford et al. ........... 715/514

OTHER PUBLICATIONS

Olivier Liechti, Mark Sifer, Tadao Ichikawa, 'The SGF Metadata Framework and its Support for Social Awareness on the World Wide Web', 1999, Information System Laboratory, Faculty of Engineering, Hiroshima Univ., pp. 1–29.*
Sifer et al., "Zooming in One Dimension can be Better than Two: An Interface for Placing Search Results in Context with a Restricted Sitemap", Proceedings 1999 IEEE Symposium on Visual Languages, p. 72.

Liechti et al., "The SGF Metadata Framework and its Support for Social Awareness on the World Wide Web", Netherlands, vol. 2, No. 4, pp. 191–208, 1999.

Liechti et al., "Structured Graph Format: XML Metadata for Describing Web Site Structure", Computer Networks ISDN System, Netherlands, vol. 30, p. 11 1998.

U.S. Appl. No. 09/747,634 entitled "System and Method for Browsing Hierarchically Based Node–Link Structures Based on Estimated Degree of Interest", filed on Dec. 21, 2000 by Stuart Card.

U.S. Appl. No. 09/732,024 entitled "Method and System for Presenting Email Threads as Semi–Connected Text by Removing Redundant Material", filed on Dec. 8, 2000 by Paula Newman et al.

Co–Pending U.S. Patent Application entitled "Method and Apparatus for the Construction and Use of Table–Like Visualizations of Hierarchic Material", filed Sep. 10, 2001 by Paula Newman et al.

* cited by examiner

Primary Examiner—Stephen Hong
(74) Attorney, Agent, or Firm—Nola Mae McBain

(57) ABSTRACT

A method for the conversion and display of tree-structured information to a "treetable", a table-like display structure, in which each path from a root to a leaf node is represented by a single column, and cells representing the immediate successors of a node are placed immediately under that node. Variation in the amount of space given to cells within particular columns is used to allow more detail to be given for selected paths and subtrees. Extraction of subparts of a treetable into another such structure is used for deeper exploration of trees. The treetable structure is also suitable for use as a selector and guide to the reading, in auxiliary displays, of the concatenated node content associated with either (a) individual columns (representing full paths), or (b) all successors to a given node.

33 Claims, 31 Drawing Sheets

About to add gap cell here

METHOD AND APPARATUS FOR THE VIEWING AND EXPLORATION OF THE CONTENT OF HIERARCHICAL INFORMATION

REFERENCE TO RELATED APPLICATIONS

The present application is related to co-pending U.S. patent application Ser. No. 09/954,388 entitled "Method and Apparatus for the Construction and Use of Table-Like Visualizations of Hierarchic Material" filed concurrently with the present application

INCORPORATION BY REFERENCE

The following patents and/or patent applications are herein incorporated by reference:

U.S. Pat. No. 6,085,202, titled "Method and System for Producing a Table Image Having Focus and Context Regions, by Rao et al. and issued on Jul. 4, 2000.

U.S. patent application Ser. No. 09/747,634, titled "System and Method for Browsing Hierarchically Based Node-Link Structures Based on Estimated Degree of Interest", by Card et al., filed on Dec. 21, 2000

U.S. patent application Ser. No. 09/732,024, titled "Method and System for Presenting Email Threads as Semiconnected Text by Removing Redundant Material", by Newman et al., filed on Dec. 8, 2000.

BACKGROUND

The present invention relates generally to the field of information display. More specifically, it provides methods for the construction and manipulation of displays of tree-structured information in a tabular form permitting rapid identification of "root-to-leaf" paths, and facilitating deeper exploration of those paths both within the tree representation, and also via auxiliary displays keyed to the latter.

To establish some terminology, a "tree" or "tree structure" is a standard term denoting an abstract data structure that models information as a set of nodes connected by directed edges such that: (a) there is exactly one element having no incoming edges, called the "root"; and (b) all other nodes have exactly one incoming edge. A leaf node is a node with no outgoing edges. All nodes besides the root node and the leaf nodes can be called "interior nodes". The "parent" of a node is the source of its incoming edge, and the "children" of a node are the targets of its outgoing edges. A "path" in a tree is a sequence of nodes such that each node except the last in the sequence is followed by one of its children.

The invention is intended for use in connection with tree structures whose paths form logical groupings, and whose interior nodes represent substantial amounts of information (rather than acting as simple containers, like file directories). For example, the nodes of inheritance trees, such as natural taxonomies or programming-language frameworks, represent collections of properties, and the paths determine the net properties inherited by an interior node or leaf. As another example, the nodes of trees used to depict email threads represent individual messages, and the paths constitute the synchronous message/response sequences within the thread. For such applications, tree visualizations should provide a convenient grasp of path relationships, while at the same time containing sufficient text to serve as overviews of tree content. Furthermore, the tree visualizations should also serve as contexts for deeper exploration of information along the paths.

Conventional representations of tree-structured material do not have these properties. Tree-structured material is conventionally visualized via either connected node-edge representations, or linear, indented representations. Both of these representations tend to waste space that might be devoted to text, and to obscure path information, in different ways. Node-edge representations have significant wasted space. To limit this while providing significant labeling information, they tend to physically intersperse unrelated paths. The alternative of using tiny nodes can partially solve this latter problem, but at the expense of omitting any information about node content. In linear, indented representations, any line may contain only textual information for one node, and nodes may appear at considerable distances from their ancestors, so that individual paths are difficult to isolate.

Furthermore, while conventional tree representations sometimes provide for selection and display of the full text underlying individual nodes, they do so one-node-at-a-time. This mechanism is inadequate and onerous in cases where there are many nodes, and the relationships among connected nodes are significant.

There are two relatively recent approaches to the display of tree-structured information that address some of the disadvantages of conventional node-edge visualizations. First, the "TreeMap" visualization, described by B. Johnson and B. Shneiderman in the paper "TreeMaps: A Space-Filling Approach to the Visualization of Hierarchic Information Structures, Proceedings of 1991 IEEE Visualization Conference, focuses on avoiding waste of space for trees whose interior nodes function as organizers or containers, mapping the tree into a nested rectangular structure, with the rectangles sized proportionately to the size of the nodes they contain, or other distinguishing principle. This approach addresses the waste-of-space problem, but only for leaf nodes, and does not alleviate, and in some cases exacerbates, the path visualization problem. Another approach is the "Degree of Interest" tree visualization, as described in a U.S. patent application Ser. No. 09/747,634, titled "System and Method for Browsing Node-Link Structures Based on Estimated Degree of Interest", by Card et al., and incorporated by reference hereinabove. The Degree of Interest tree visualization is a node+edge visualization that permits the selection of a particular node of interest, and expands that node and (proportional to distance from the selected node) closely related nodes and their associated text, at the expense of more distant nodes. Such an approach could be modified to enlarge all nodes on a path from the root to a selected node, but this would allow only one such path to be easily seen at any particular time.

The present invention addresses the path comprehension problem directly, by converting the tree-structured material into a table-like structure, hereinafter called a "treetable" in which each path is represented by a column of the table. In this way, the ancestors of a given node can be seen at a glance. Furthermore, all children of a node are placed directly under that node, and can also be seen at a glance. Wastage of space is avoided in the sense that no space is devoted to the presentation of edges, and more space is available for the display of content for what may be the more important nodes, namely, those serving as roots to the broadest subtrees.

However, as in any other tree representation, the size and shape of the tree of the tree determines how much content may be given for the nodes within a limited display area, so that for large trees the amount of information that can be given for nodes within an initial visualization may be insufficient. The present invention addresses this problem in two ways. First, it adapts some methods associated with "degree of interest" displays to allow selective expansion of focus areas in ways consistent with the table-like geometry. In particular, it adapts mechanisms of (a) U.S. patent application Ser. No. 09/747,634, titled "System and Method for Browsing Node-Link Structures Based on Estimated Degree of Interest", by Card et al., and (b) U.S. Pat. No. 6,085,202, entitled "Method and System for Producing a Table Image Having Focus and Context Regions", which are incorporated by reference hereinabove. The second means by which the present invention addresses the problem of displaying large trees is by providing for the extraction of treetable subparts into auxiliary displays, so that more space is available for text in those subparts, while retaining the original representation, in either full-scale or outline form, to maintain user awareness of context.

But no matter how much information may be incorporated within a table-like tree representation, the individual nodes may represent far more material than can be accommodated in a single display. Many applications of conventional tree displays, such as indented file directories or indented listings of messages within an email thread, allow the user to select individual nodes for separate display. This, however, is less than satisfactory for applications where the nodes are logically related. Therefore, the present invention provides for the use of treetables as guides for reading the concatenated content of closely related nodes representing either full paths or children of the same root. The content presented may be the full content, or may be abbreviated in ways appropriate to the application. For example, an application presenting a path of an inheritance hierarchy permitting property overrides, such as a programming language class hierarchy might highlight properties of predecessors not overridden by the leaf node.

While the method provided by the invention in the area of auxiliary displays of node content is a general one, one embodiment of the invention directed specifically to the production of auxiliary displays of messages in email threads utilizes a technique which is discussed in U.S. patent application Ser. No. 09/732,024, titled "Method and System for Presenting Email Threads as Semi-connected Text by Removing Redundant Material", by Newman et al., incorporated by reference hereinabove. This patent describes the concatenation of the significant texts of the messages of an email thread, shorn of extraneous information such as redundant quotes and contact information, into a single document. The present invention further exploits the methods of U.S. patent application Ser. No. 09/732,024 to present the concatenated messages with even more quote information elided, because of their presence in an adjacent node.

Further advantages of the invention will become apparent as the following description proceeds.

SUMMARY OF THE INVENTION

Briefly stated and in accordance with the present invention, there is provided a method for the conversion and display of tree-structured information to a "treetable", that is, a table-like display structure like that shown in FIG. 1, in which each path from the root to a leaf node is represented by a single column, and the cells representing the immediate successors of a node are placed immediately under that node. The conversion method allows for variation in the amount of space given to cells within particular columns, to allow more detail to be given for selected paths and subtrees of immediate interest to the user.

Methods are also provided for the use of the treetables as a base for the creation of auxiliary displays. One such method supports the extraction of subparts of a treetable into another such structure, allowing more space for the deeper exploration of medium-sized trees, and for reasonable perusal of large trees whose full representation leaves no room for useful amounts of text.

Another such method is provided to exploit the treetable structure for use as a selector and guide to the reading, in auxiliary displays, of the concatenated node content associated with either (a) individual columns (representing full paths), or (b) all successors to a given node. A particular use, in one embodiment, of such auxiliary displays is in conjunction with the display of email threads, where they enable substantial quote elision. The auxiliary structures may be displayed in separate windows or, for use in limited display space, in attached frames.

The conversion from tree to treetable consists of two fundamental steps, the first developing an outline treetable identifying the placement and relative sizes of table cells assuming a unit width for each column, and the second developing display specifications associating a specific size and content with each cell.

The first step establishes the basic layout of the treetable. The number of rows is equal to the height of the tree, that is, the length of the longest path from the root to a leaf node. The number of columns is equal to the number of leaf nodes of the tree. In the basic layout each column has unit width. The topmost cell, representing the root, spans the first row, that is, its width is equal to the total number of columns. Cells representing the children of the root are placed in the next row, in sequence. The width of each such "child cell" is equal to the number of leaf nodes that are ultimate descendants of the node represented by the child cell (or 1 if the node has no descendants). In subsequent rows, for each cell C in the preceding row, "child cells" for the children of the node represented by C are placed immediately under C. The width of each such child cell is equal to the number of leaf nodes that are ultimate descendants of the node it represents, etc. Cells representing leaf nodes in a particular row give rise to gaps in that position in all subsequent rows.

The second step associates a specific size and content with each cell based on:
a) The basic layout obtained in the first step
b) Available display space
c) The selection of a column or cell (or lack of same)
d) A system of controls dictating the interpretation of selections (or lack of same) and other details of the treetable produced. These controls may be organized and realized in various ways, e.g., by additional mode-establishing selections, or by gesture (combinations of selections and keyboard inputs), but ultimately comprise:
  1. Specifications as to the interpretation of a cell selection as either a column spanned by the cell or the subtree headed by the cell (i.e., the part of the treetable representing the subtree headed by the node represented by the cell).
  2. Specifications as to how cell sizes are to be obtained, with widths obtained either by giving equal widths to each column (resulting in a "natural" allocation), or by preferring (to some indicated extent) columns covered by focus areas, and with heights obtained partially by focus considerations.
  3. Specifications whether the full display space is to be used for the treetable or a more limited space (see below).

4. Specifications as to whether text is to be incorporated into cells of the treetable and, if so, how much.

Given alternatives in these areas, specific widths are associated with each column and are used to multiply the cell widths in the basic layout. Then, given these widths, along with some constraints on the text to be incorporated, the amount of content that should be provided for each cell is determined. Selections and focus areas are highlighted by color or by other means, e.g., grey-scale.

The mechanisms supporting preferred focus areas are partially adapted from methods associated with "degree of interest" displays. The use and implementation of subtree selections, which may cause expansion of all cells within the subtree, is partially adapted from U.S. patent application Ser. No. 09/747,634, entitled "System and Method for Browsing Node-Link Structures Based on Estimated Degree of Interest", by Card et al., which is incorporated by reference hereinabove. Also, because individual columns, here representing tree paths, may also be selected as foci, the use and implementation of selection foci also draws from U.S. Pat. No. 6,085,202, entitled "Method and System for Producing a Table Image Having Focus and Context Regions", which is incorporated by reference hereinabove.

The extraction of subparts of the treetable for separate display involves adding a step to the two fundamental steps described above. After the basic layout is obtained, a set of adjacent columns is extracted from the layout. The extracted columns may be an arbitrary set, or may be columns spanning (the treetable representation of) a particular subtree. The extracted columns are then treated as the basic layout for the secondary display. If the extracted columns represent a subtree, rows above the cell representing the root of the subtree may be omitted. The use of size controls limiting the amount of space used for the full treetables (discussed above) is intended, in part, for use in this context, to permit the simultaneous viewing of both the full treetable and the extracted part.

The exploitation of treetables as navigation guides for the reading of the full content of sets of related nodes is provided by two alternative embodiments, both concatenating material within significant logical units of the tree. The first embodiment type uses additional controls to extend the meaning of a selection to give rise to an auxiliary display in a separate window. In particular, a selected column may give rise to an auxiliary display concatenating the full or modified material associated with each cell of the column, while a selected subtree may give rise to a auxiliary display concatenating the texts associated with the children of the subtree root. A second embodiment employs dual frames, so that both treetable and expanded content may be viewed simultaneously in the same window. One frame is obtained by a variant of the basic treetable construction method in which, after the basic layout is developed, it is partitioned vertically into subtables. Then display specifications are built for each resulting subtable and concatenated. The other frame is occupied by the full text of a selected column, and color or other method of highlighting is used to maintain user awareness of the path being viewed and its relationship to the tree as a whole. Finally, links from the latter (right) frame can be followed to provide child information for a given node.

One embodiment uses treetables as guides to the reading of related nodes of an email thread. Content displayed in this form can be abbreviated (without losing essential information) by using the methods discussed in U.S. patent application Ser. No. 09/732,024, incorporated by reference hereinabove, and further if desired by eliminating any full quotes of immediately preceding messages in the concatenation.

While the present invention will be described in connection with a preferred embodiment and/or method of use, it will be understood that it is not intended to limit the invention to that embodiment and procedure. On the contrary, it is intended to cover all alternatives, modifications and equivalents as may be included within the spirit and scope of the invention as defined by the appended claims.

DETAILED DESCRIPTION OF THE INVENTION

Turning now to the Figures, FIGS. 1 through 15 illustrate treetables produced by, and treetable-based interactions supported by, the methods making up the invention. This embodiment of the invention presents an email review tool using treetables for thread exploration. The underlying trees in these Figures represent threads of a newsgroup. The visualizations were obtained by submitting display specifications to a display processor, for example a Netscape browser or other viewer. However, the methods of the invention are general ones, which can be used to create specifications for many kinds of display processors, such as those embedded within graphic user interface (GUI) toolkits associated with many programming languages (to be discussed more fully herein below with respect to FIG. 16). FIGS. 16 through 31 illustrate the methods used to develop the display specifications.

It should also be noted that although this particular embodiment is directed to an email review tool, the invention could be used to visualize many different kinds of information, such as biological taxonomies, object-oriented programming language frameworks, trees tracing language descent, organizational charts, and genealogies, to name a few examples. The important related characteristics between these examples is that they all use trees to visualize information wherein the paths in the trees represent logical groupings and the nodes of the trees contain conformation. The present invention provides a useful tool for visualizing any such tree.

Figure 1:
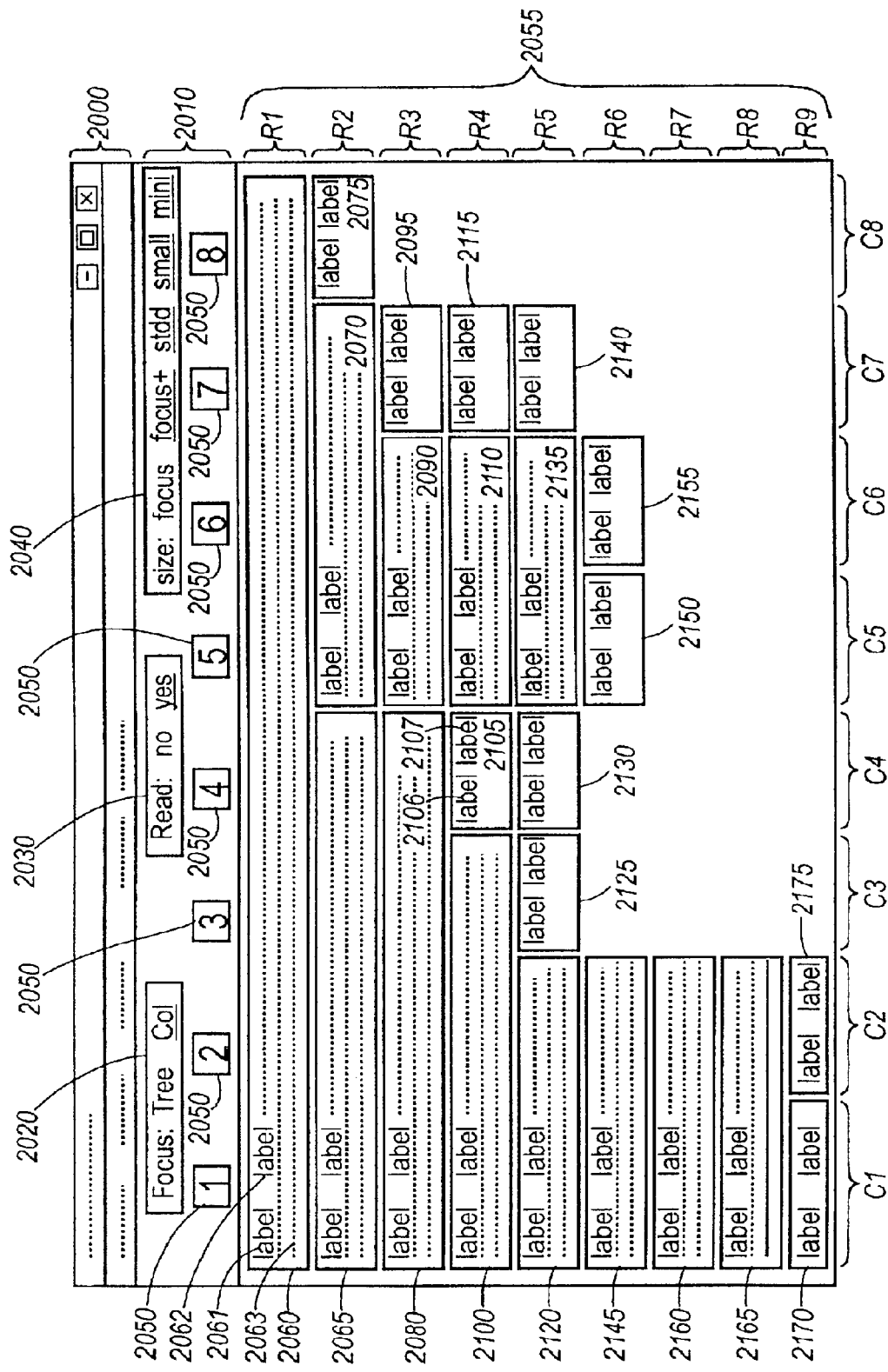
FIG. 1 is a treetable with uniform column sizes.

FIG. 1 shows a treetable with uniform column sizes, in this case because there is no explicitly selected focus. Title line 2000 consists of a title line produced by a Netscape browser together with controls specific to the browser. It should be noted that title line 2000 is an artifact of using the browser as the display processor. If the invention was implemented using a dedicated display processor, or the display processor of another browser or program, title line 2000 may be reduced or even omitted.

Control line 2010 is a control line for the treetable display mechanism, illustrating one embodiment of display controls. While control line 2010 is one embodiment of a control line; another embodiment showing additional controls is discussed herein below with respect to FIG. 10. The control line 2010 provides three kinds of selections: focus selection 2020, read selection 2030, and size selection 2040. Each selection 2020, 2030, 2040 shows the current choice, denoted by lack of underline, as well as the other selectable choices. The selection options could also be implemented as drop-down menus or using other means of choice presentation. Additionally the current selection can be denoted in various ways including grey scale, color, and reverse video, background patterns, outlining, etc. Also, a subset of the selection options shown could be presented, and/or the options could be grouped in many different option groups, and/or renamed, and/or revised into similar but not identical selections.

Focus selection 2020, headed by the keyword "focus", provides a choice as to how selections of cells within the table are to be interpreted as indicating a focus. A choice of "tree" indicates that the selection of a cell places the subtree headed by the cell (i.e., the portion of the treetable representing the subtree headed by the node represented by the cell) into focus. A choice of "col" indicates that the selection of a cell places the leftmost column covered by the cell into focus. Read selection 2030, headed by the keyword "read", indicates whether or not (by choices "yes" or "no") auxiliary content displays are to be produced for selections. Size selection 2040, with keyword "size", combines two types of controls, namely, the space to be occupied by the treetable as a whole, and also how the selection of a focus is to affect the relative apportioning of widths to cells. The first two choices given in this instantiation of the focus selection 2040, "focus" and "focus+", indicate a full-size treetable with preference (focus) or even greater preference (focus+) given to cells in the focus area if any. These choices are used for exploration in-situ of portions of the tree. The other three choices, "stdd", "small", and "mini", all indicate that no preference is to be given to focus cells, and that the overall size of the table be, respectively, either full size, reduced to some extent, or reduced to a greater extent. Also, the choice of "stdd" licenses the inclusion of text to the extent that cell sizes permit, while the choices "small" and "mini" explicitly forbid the inclusion of text. The three choices not giving preference to focus cells are used to (a) regain perspective during and after expansions of portions of the tree, (b) give complete pictures of large trees, and (c) to create small representations to serve as context for auxiliary displays within a limited screen area. To complete the example, control line 2010 includes column headers 2050, which are used to select entire columns C1–C8 as focus areas.

The remainder of the Figure shows a treetable 2055 comprised of Rows R1–R9 and Columns C1–C8. It should be noted that in this example the rows R1–R9 and columns C1–C8 are arranged from top to bottom and from left to right, respectively, however, this is for illustrative purposed only. The visualization could equally be rearranged such that the rows are arranged from bottom to top and/or the columns are arranged from right to left. Equally possible are arrangements wherein the columns and rows have been interchanged such that the rows R1–R9 become columns, and the columns C1–C8 become rows. While the illustrated arranged has been found to be suitable for viewing the hierarchically related information of email threads, the other arrangements are possible and may be more suitable for viewing hierarchically related information, including that of email threads, in other situations.

The treetable 2055 is made up of cells such as cells 2060, 2065, 2070,2075, 2080, 2090, and 2095. Each cell in the table represents a node of the underlying tree and exactly spans the cells representing its immediate descendants in that tree. The root of the tree, which in this embodiment is the initial message of an email thread, is represented by cell 2060, which occupies the whole of the first row R1 of the treetable, and spans all the columns C1–C8. The material included in cell 2060 includes a label 2061 (in this embodiment a message number) which can be used to select the cell as the focal point, and another label 2062 (in this embodiment an author name) which, when selected, brings up the text of the associated tree node. In this embodiment the text of the associated tree node would be the entire message. Cell 2060 also has a body 2063, which in this embodiment consists of at least part of the text of the message. It should be noted that the body 2063 is comprised of text in this embodiment because the invention has been applied to textual information, however, in other embodiments the body may be information comprised of text, figures, graphics, MPEG files, MP3 files or any other format which may be used to store textual, graphical, audio or visual information. All cells in a treetable usually contain at least one selectable element, such as label 2061 or label 2062, which, when space is very constrained, may consist only of a single character. The inclusion of full labels, and other information, depends on the available space within the cell and other controls. For example, Cell 2105 includes two labels 2106, 2107 but does not include a body.

Cells 2065, 2070, and 2075, comprise the second row R2 of the treetable and represent the children of the node represented by cell 2060. In this embodiment they are the responses to the initial message. The width allocated to a particular cell depends on the number of columns it spans, and the widths of those columns. In treetable 2055 in FIG. 1, all columns C1–C8 have equal width. Therefore, the amount of space allocated to a given cell is directly proportional to the number of columns it spans. (The latter, in turn, is equal to the number of leaf-node descendants of the node represented by the cell.) Thus cell 2065, spanning 4 columns C1–C4, provides more space for text than either cell 2070, which spans 3 columns C5–C7, or item 2075, which spans 1 column C8, represents a leaf and does not contain any text. In the third row R3, cell 2080 represents the single child of the node represented by cell 2065, while cells 2090 and 2095 represent the children of the node represented by cell 2070. Each column in the table, such as column C8, spanned by cells 2060 and 2075, represents a single root-to-leaf path of the tree.

Figure 2:
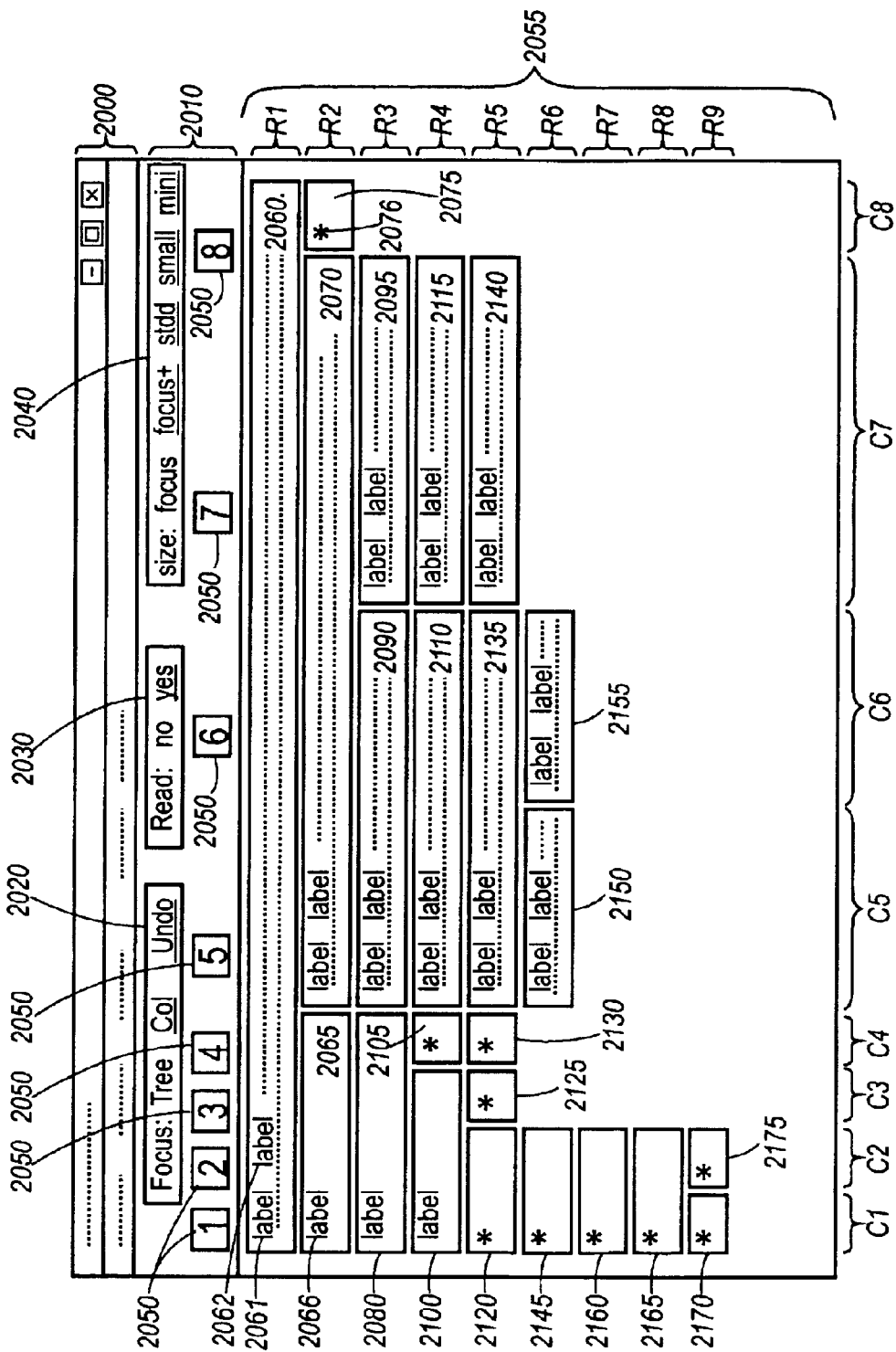
FIG. 2 is the treetable of FIG. 1 focused on a subtree headed by a cell.
Figure 3:
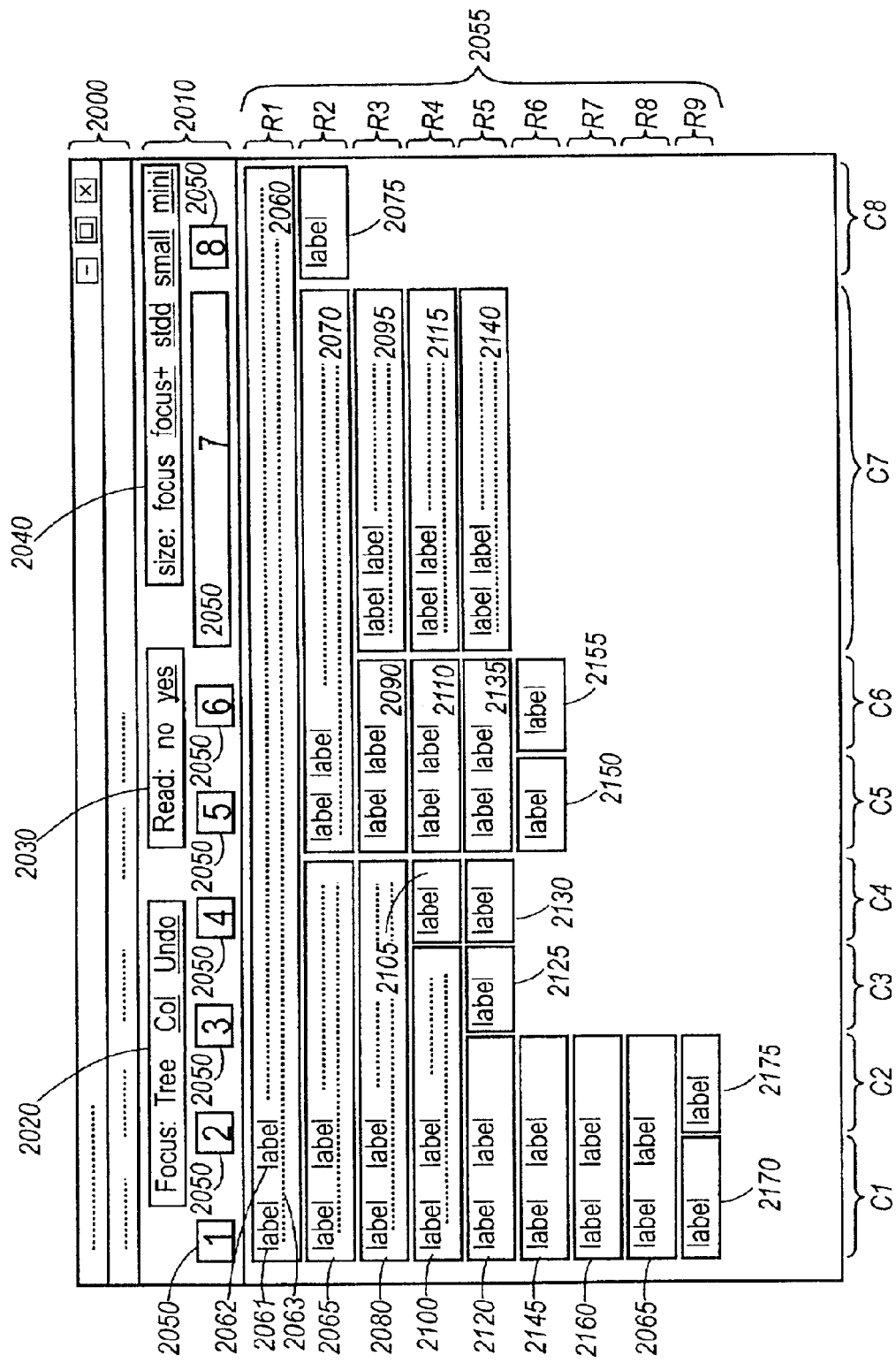
FIG. 3 is the treetable of FIG. 1 focused on a column
Figure 4:
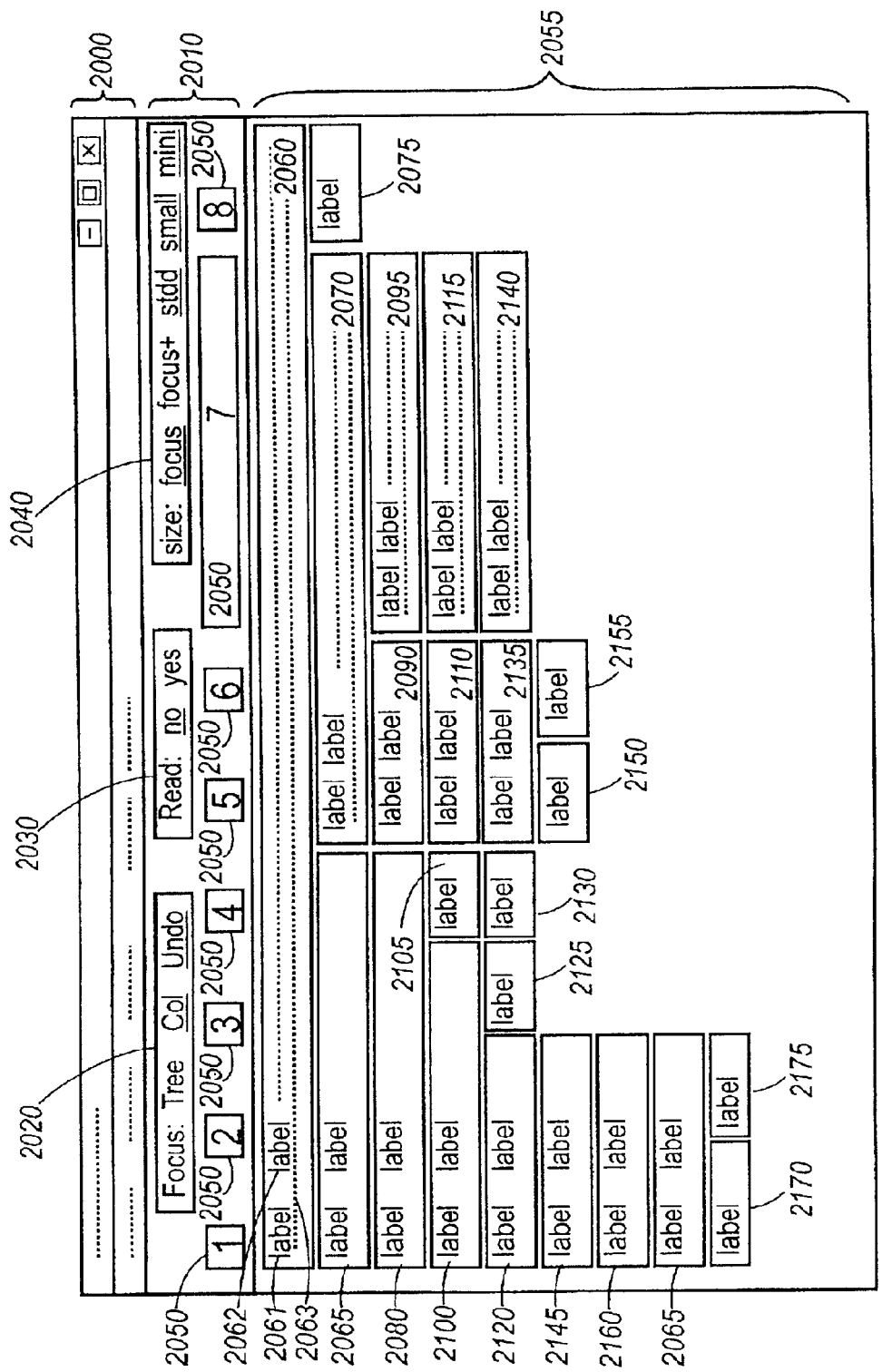
FIG. 4 is the treetable of FIG. 1 with expanded focus on a column.

FIGS. 2 through 4 illustrate the use of focus areas to give greater space to selected portions of the tree, either subtrees or paths. As these Figures show the same treetable 2055 shown in FIG. 1, the same reference numerals will be used to denote the same features shown in FIG. 1. FIG. 2 shows the treetable shown in FIG. 1, but with the subtree headed by the cell 2070 given prominence. Focus selection 2020 shows the focus set to interpret cell selections as subtree selections. Read selection 2030 is set to "No". Size selection 2040 shows the size has been set to "focus", which uses a full-size display, with preference given to focus columns, but with a limitation on the amount of descriptive text to be incorporated. This limits the cell height. All selections are shown by lack of underline but could be shown in various ways discussed above. The combination causes the cell 2070 and all the cells 2090, 2095, 2110, 2115, 2135, 2140, 2150, and 2155 to be considered as within the focus area, and the columns spanned by cell 2070, columns C5, C6, and C7 in the column header 2050, to be given additional width relative to the other columns, for example, columns C1–C4. In addition, the cells in the focus area may be highlighted, with different highlights used for the selected cell 2070 and the rest of the cells 2090, 2095, 2110, 2115, 2135, 2140, 2150 and 2155, to distinguish them from cells outside the focus area, such as cells 2060, 2065, 2080, and 2100. Highlighting may be shown in a variety of ways, for example by color, greyscale, reverse video, background patterns, or borders which visually differentiates the selected cells. Cell labels and the cell body are placed in the cells to the extent that cell width and height constraints allow. Therefore, cell 2060 displays both the complete cell labels 2061 and 2062, and a portion of the message text as the body 2063 as before. However, cell 2065, which has been de-emphasized, only shows a fraction of the information, in this case a single cell label 2066 and cell 2075 shows a single selectable character for cell label 2076.

FIG. 3 again shows the treetable of FIG. 1, but with a column rather than a subtree focus. Size selection 2040 has been set to the use of a full size display, by selecting "focus" (shown by lack of underline), with preference given to focus columns, as above. Control line 2010 shows the selection of column C7 by showing the "7" in the column selection 2050 in a preferentially larger box than "1–6" or "8". However, selection can be shown in a variety of ways including color, grayscale, background patterns, borders, or reverse video for example. The combination causes all cells that include the identified column, in this example cells 2060, 2070, 2095, 2115, and 2140, which are column 7, to be given additional space relative to the other cells. These cells represent a single path from the root of the tree, represented by cell 2060, to a leaf, represented by cell 2140. Both the column selection C7 in control line 2010 and the cells of the selected column C7 are highlighted, and other cells 2065, 2075, 2100, 2110, 2125, 2135, 2080, 2090, 2105, 2120, 2130, etc., are dimmed, to emphasize the focus. Alternatively, a similar effect could be obtained by setting the focus selection 2020 to "col", and selecting any cell within column C7. For treetables longer than the display window, this alternative would also scroll the display, if necessary, to bring cells below the selected cell into view.

It should be noted that in FIGS. 2 and 3, focus selections were used to determine a focus area that might then be highlighted to differentiate the focus selection from the rest of the tree-table for the user. In each of these cases the focus selections consisted of contiguous groups of cells, however this need not be so. For instance a well-known search algorithm could be used to search for all the cells containing a key word, phrase, or other attribute, a user could select a non-contiguous group of cells, or other methods wich would select a non-contiguous group could be used. Once a selection has been made the highlighting methods discussed above can then be applied to the selection.

FIG. 4 again shows the treetable of FIG. 1, but with the focus area given greater prominence. Size selection 2040 shows that "focus+" has been set (shown by lack of underline), which uses a full-size display, with maximal preference given to focus columns. Control line 2010 shows the selection of column C7, as was shown in FIG. 3. This combination of size selection 2040 with the column selection causes all cells that include the identified column, in this case cells 2060, 2070, 2095, 2115, and 2140, to be given more space and they may be highlighted as discussed with respect to FIG. 3. In particular, greater height is given to cells 2060, 2070, 2095, 2115, and 2140, allowing the inclusion of a larger amount of text. Also, the read selection 2030 is set to "yes", enabling the auxiliary display of FIG. 5. Again, as in FIGS. 2 and 3, the cell labels and the cell body are placed in the cells to the extent that cell width and height constraints allow.

Figure 5:
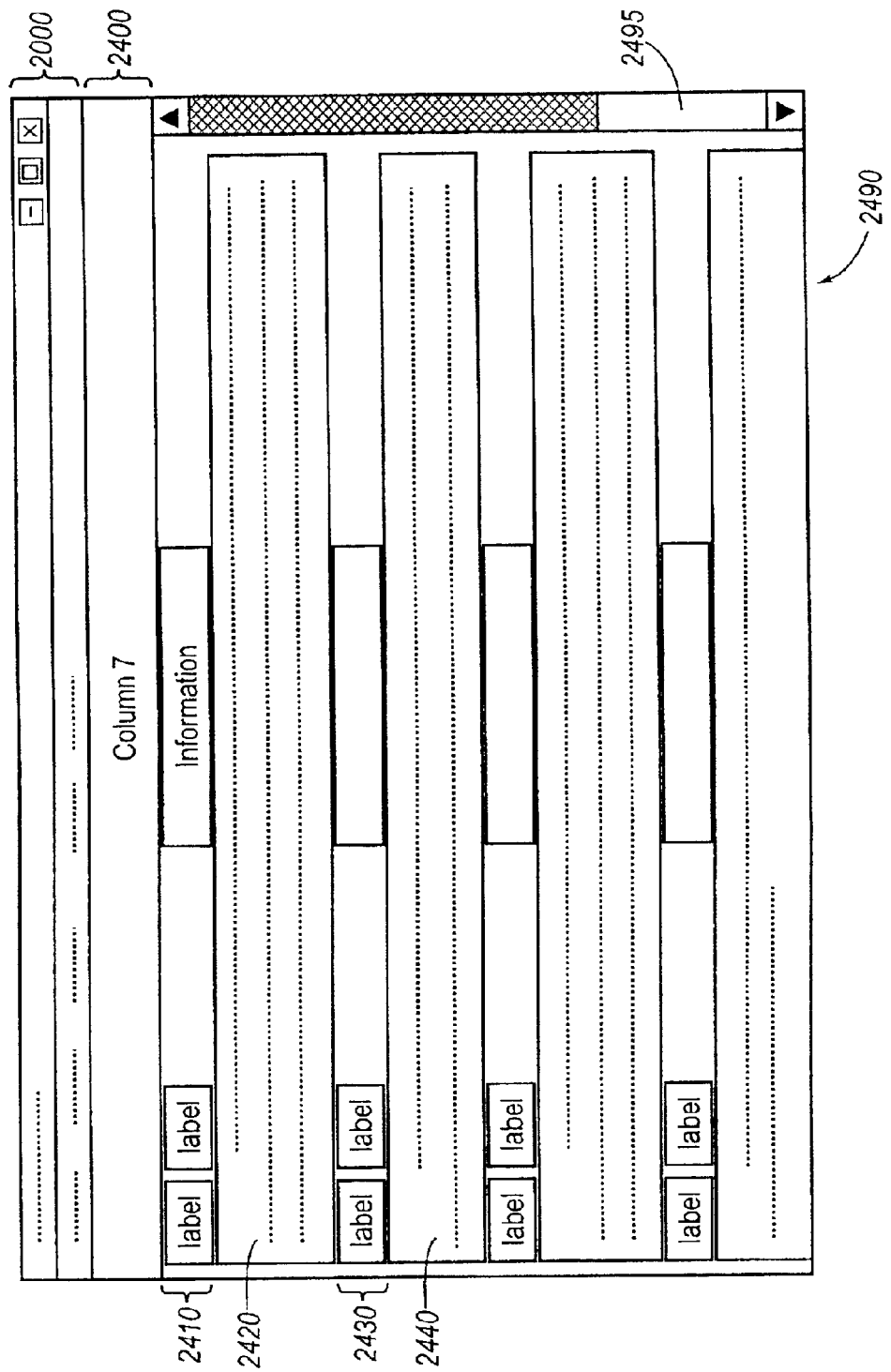
FIG. 5 is an auxiliary display of the treetable of FIG. 1 showing a "column reading view".
Figure 6:
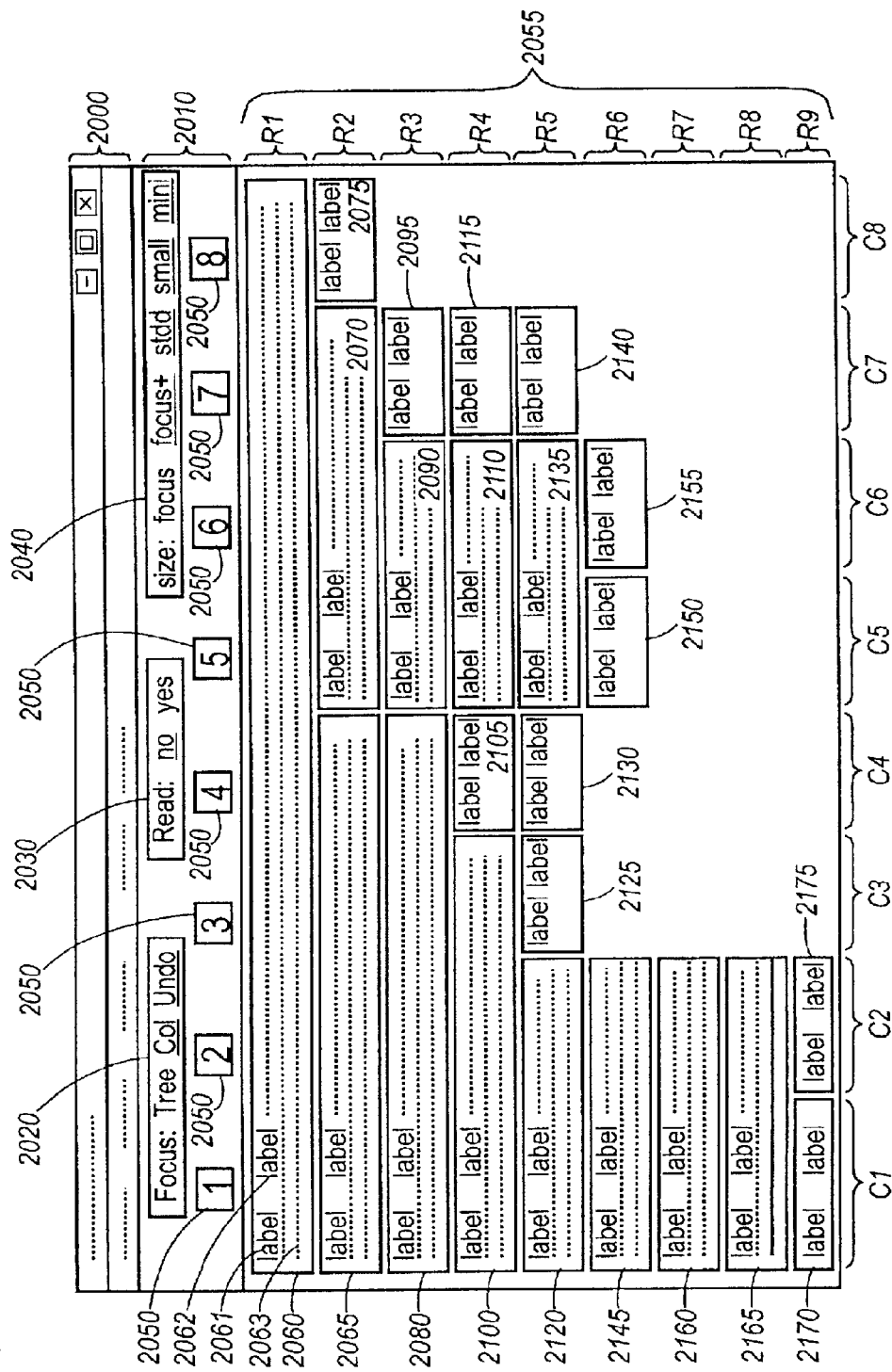
FIG. 6 is the treetable of FIG. 1 with controls set to enable the auxiliary display of a "successors reading view".
Figure 7:
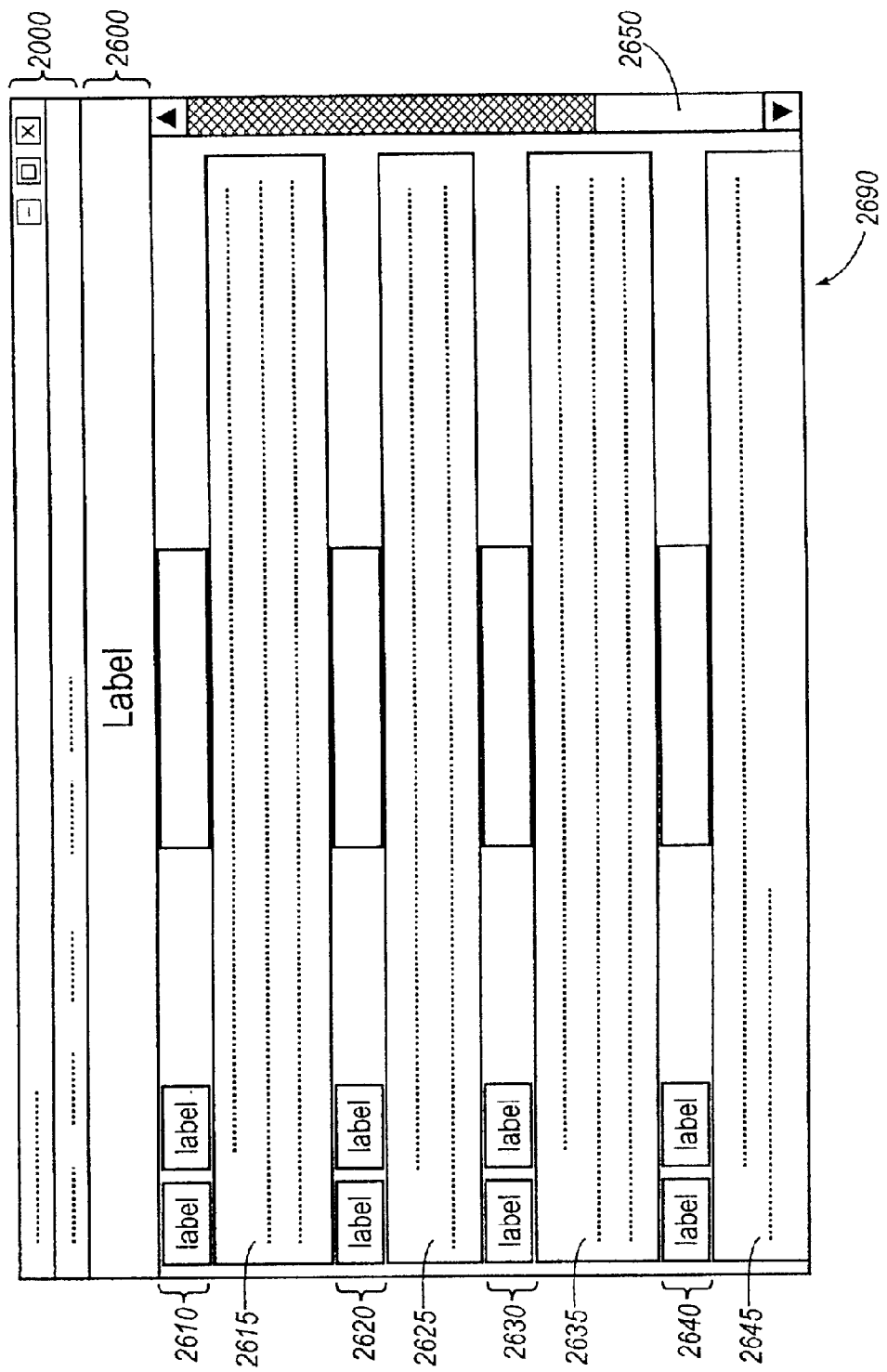
FIG. 7 is an auxiliary display of the treetable of FIG. 1 showing a "successors reading view".

FIGS. 5 through 7 illustrate the use of auxiliary displays for "reading views" giving application-dependent amounts of content for nodes of the tree represented by the treetable, concatenated into logical groupings of particular significance. These logical groupings are: (a) the nodes along individual "root-to-leaf" paths of the tree, represented by cells along individual columns, and (b) the children of a specific node, represented by cells immediately below the cell representing that node. FIG. 5 illustrates a reading view for column C7 of the preceding FIGS. 2 through 4, concatenating the content of the nodes represented by the cells in column C7. The auxiliary display 2490 shown in FIG. 5 is obtained by first setting the read selection 2030 of the treetable display 2055 to "yes", and then selecting the desired column, in this example column C7 as shown in FIG. 4. Because selecting a column of the treetable causes the cells of that column to be given preferential space and/or highlighting, the treetable serves as a guide to what can be a significantly more lengthy view of the column content. Column header 2400 shows the selected column number as seen in treetable display 2055. Element header 2410 contains the labeling information of the first cell of the selected column, which corresponds to cell 2060 as shown in FIG. 4, and also possibly contains additional cell information. For example when reviewing an e-mail thread a date is may also be included. Body 2420 consists of text associated with the tree node represented by that cell 2060. Element header 2430 contains the labeling information of the next cell in the column, cell 2070 as shown in FIG. 4. Body 2440 consists of text associated with the tree node represented by that cell 2070. The rest of the column C7 is shown accordingly below. In this example, the elements of the column represent the messages of an asynchronous conversation of an email thread. The message texts incorporated into the reading views may be reduced to their essential content, removing headers and trailers, and abbreviating quotes or, if the quotes are fully redundant with the text associated with the prior element, removing them completely, so that the entire sequence of messages can be read very efficiently. A method for reducing such text is described in U.S. patent application Ser. No. 09/732,024 incorporated by reference hereinabove. Other embodiments of column reading views could be used that are more column-specific. For example, in an alternative embodiment of email application, the texts associated with the nodes represented by the column might be summarized in a column-specific way. However, even when the texts are summarized the content may take considerable space to display. Therefore, a scroll bar 2495 is included to allow the user to view desired portions in a limited display area.

Auxiliary displays are also used to show the content of the immediate children of a particular tree node, again keyed to the base treetable. FIGS. 6 and 7 illustrate the use of treetables for this purpose.

FIG. 6 again shows the treetable of FIG. 1, with focus selection 2020 set to "tree", read selection 2030 set to "yes", and the root cell 2060 selected. The selection of the root cell 2060 in conjunction with the read selection 2030 set to "yes", brings up the auxiliary display 2690 shown in FIG. 7. Auxiliary display 2690 begins with a header 2600 indicating what is displayed and label information of the selected cell, which is cell 2060 of as shown in FIG. 6. In this example, because the treetable represents the messages of an email thread, this header refers specifically to a parent "message" and its "responses". This is followed by an element header 2610, and body 2615, respectively containing label information for the selected cell 2060, and text associated with the tree node represented by cell 2060. This is then followed by a header 2620 indicating the beginning of information associated with the children of the tree node represented by cell 2060, and then the headers 2630,2640 and texts 2635, 2645 associated with those children. In this example the immediate children are the nodes represented by cells 2065, 2070, and 2075 shown in FIG. 6. As indicated by the scroll bar 2650, the display may be scrolled to see the complete content.

Figure 8:
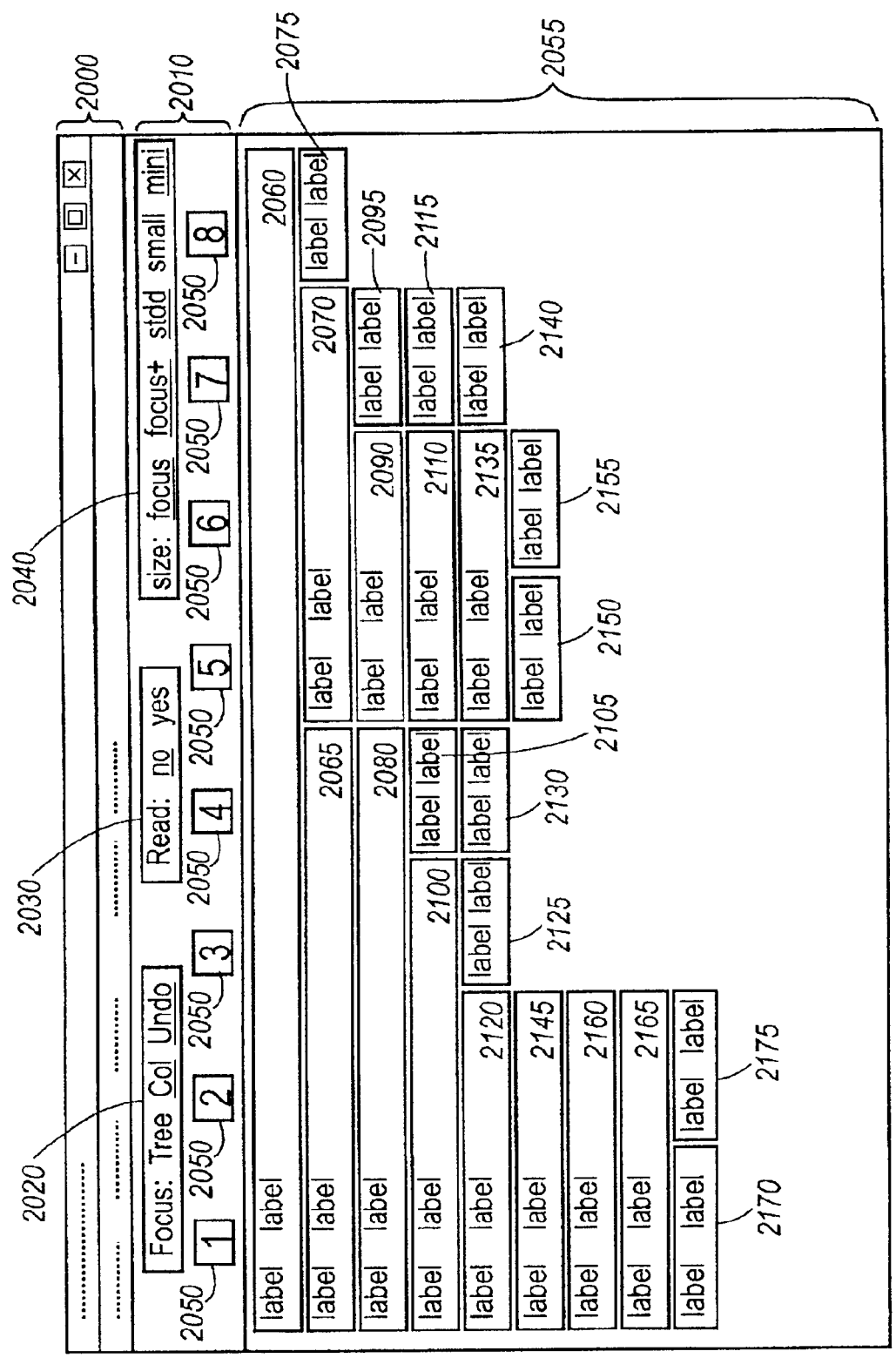
FIG. 8 is the treetable of FIG. 1 with the horizontal and vertical size strongly limited.
Figure 9:
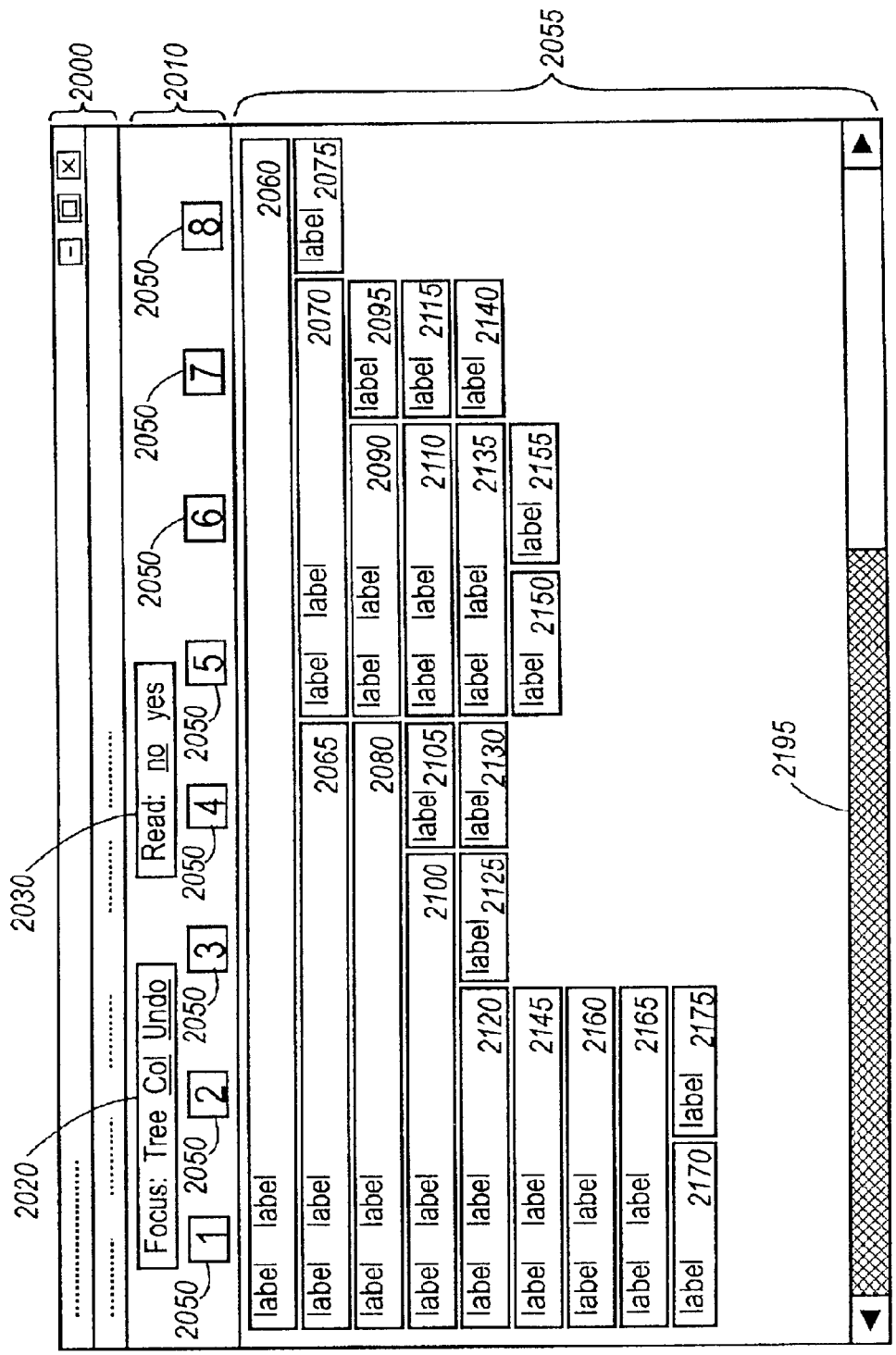
FIG. 9 is the treetable of FIG. 1 with the size even more limited.

FIGS. 8 and 9 illustrate the use of reduced size treetables to (a) provide a full picture of especially large trees, and (b) limit the space needed for treetables when in use as guides to auxiliary displays. The treetables shown in FIGS. 8 and 9 are the same as shown in the previous Figures, therefore, the same reference numerals will be used to denote the same features. In FIG. 8 the focus selection 2020 is set to "tree", and root cell 2060 is selected. However, the size selection 2040 is set to "small". This restricts the total size of the display area allocated to the table, and also keeps cells in the focus area, in this example all the cells in the treetable, from being expanded. In this form, while the cells show the selectable levels associated with the cells, none of the body is shown. However, the selected cell 2060 and all the cells in the focus area are highlighted, as before, so that the reduced size treetable can serve as a convenient guide to the auxiliary displays. FIG. 9 again represents the same tree but with the size selection 2040 set to "mini". This further restricts the display space allocated, causes the use of a smaller font for the cell labels and/or truncation of the cell labels, and introduces scroll bar 2195 for scrolling through the tree.

Figure 10:
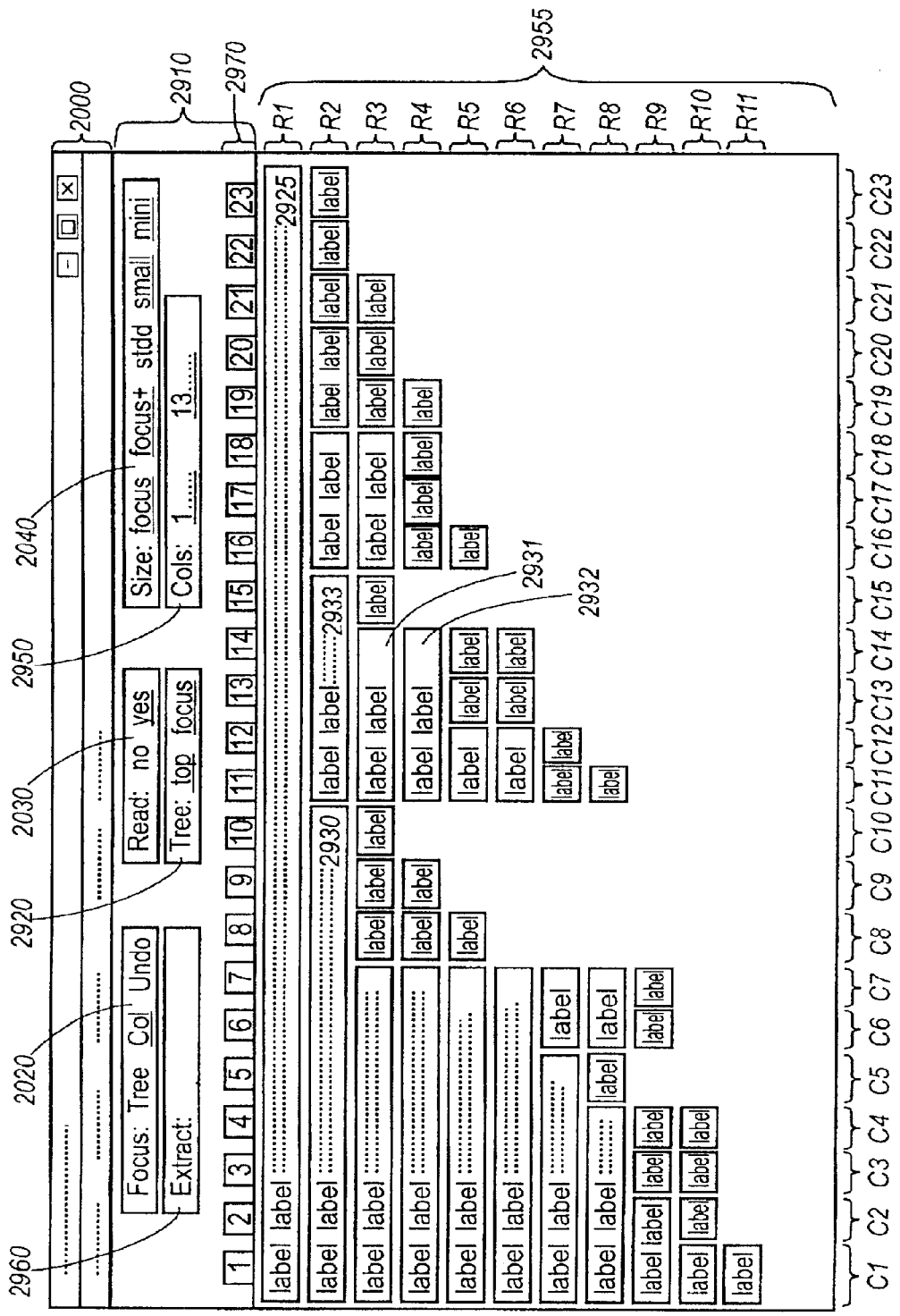
FIG. 10 is a treetable including extraction controls.
Figure 11:
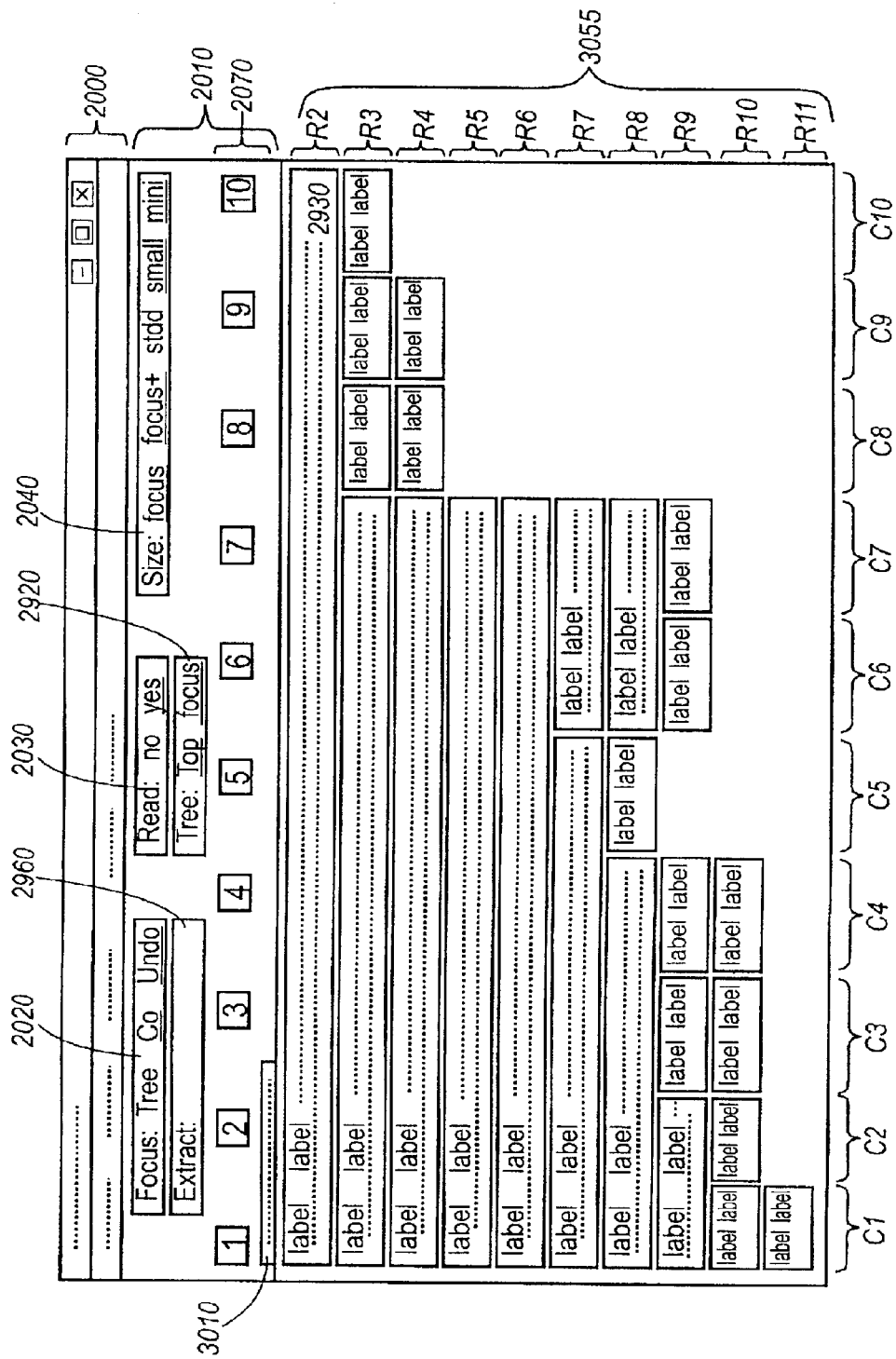
FIG. 11 is a treetable obtained by extracting a subtree from the treetable of FIG. 10.
Figure 12:
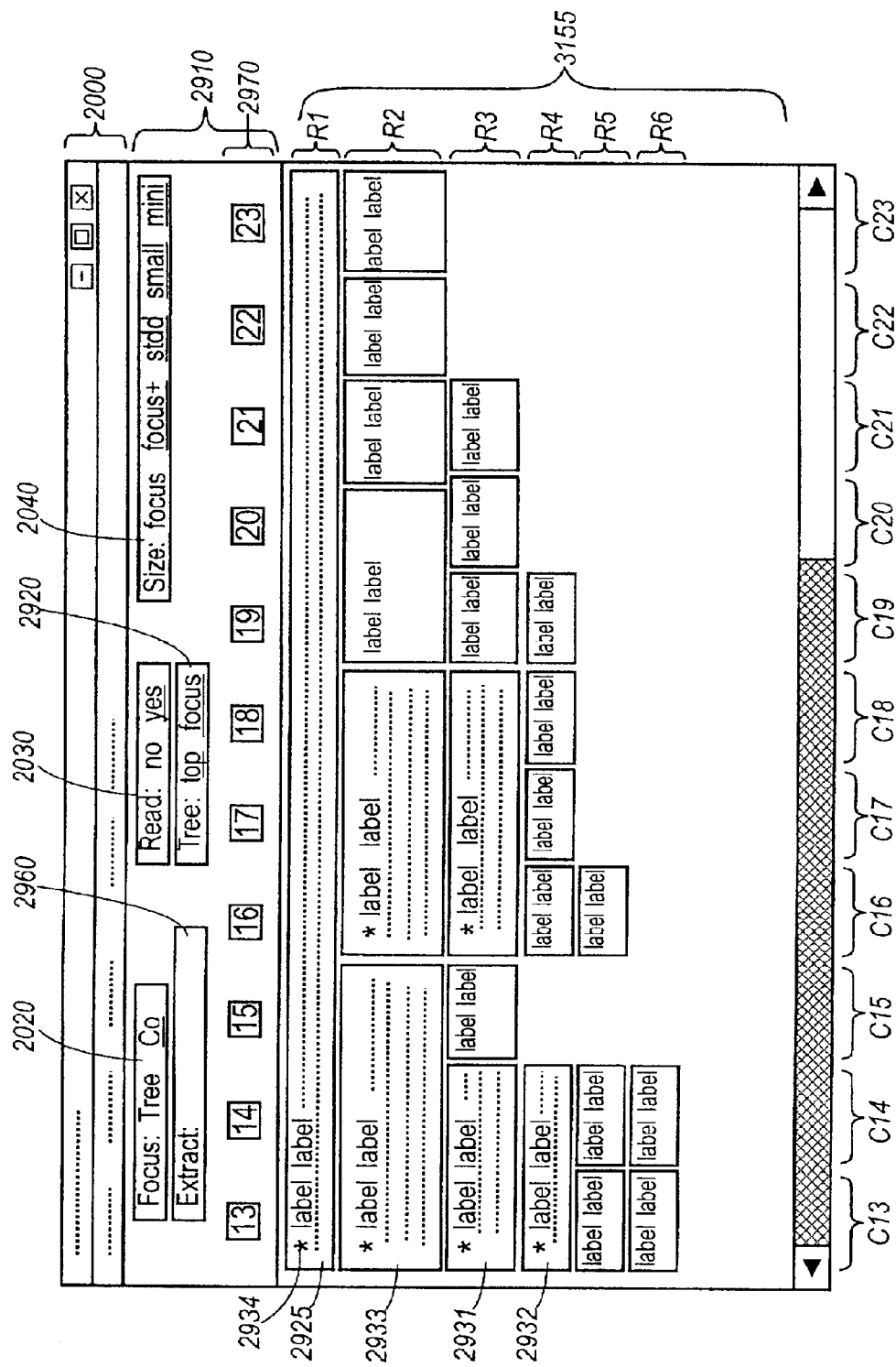
FIG. 12 is a treetable obtained by extracting columns from the treetable of FIG. 10.

FIGS. 10 through 12 illustrate another embodiment having additional control commands and the extraction of subparts of the treetables to auxiliary displays for more detailed exploration. FIG. 10 shows a treetable 2955 for a tree containing rows R1–R11, columns C1–C23, and 54 cells. Because of the number of cells, space is available for text in only a small proportion of the cells. For instance, the root cell 2925 in row R1, two children cells in row R2, and the descendents in rows R3–R7 that span columns C1–C7 or columns C1–C6. Accordingly, the control line 2910 includes not only the features of control line 2010 of the treetable in FIG. 1, namely focus selection 2020, read selection 2030, and size selection 2040, but also a second set of controls, namely extract title 2960, tree selection 2920, and column selection 2950, to permit extractions of treetable subparts. The extraction controls provided in this embodiment allow the extraction of either (a) the cells representing a particular subtree (with or without the cells representing ancestors of the subtree root) or (b) one of a set of predefined column ranges. Other embodiments may allow additional types of extraction, for example, extraction of columns within column ranges explicitly specified by the user.

Extract title 2960 categorizes tree selection 2920 and column selection 2950 as extraction controls. Tree selection 2920 permits a choice between two types of subtree extraction. A choice of "top" enables the extraction of a treetable consisting of all the columns associated with a particular subtree, but starting at the first row R1 of the original treetable (i.e., also including cells in rows above the part of the treetable representing the subtree). A choice of "focus" causes the extraction of a treetable consisting of the cell representing the subtree root, and all cells below it. Column selection 2950 permits a choice between some pre-specified column ranges, which in this example are columns 1 through 12, identified by "(1 . . . )", and columns 13 through 23, identified by "(13 . . . )" If, in FIG. 10, the tree selection 2920 choice "focus" were made, and then cell 2930 were selected, the result would be the extraction of the part of the treetable representing the subtree rooted in the node represented by cell 2930, as shown in FIG. 11. If, in FIG. 10, the column selection "(13 . . . )" were made, the result would be the extraction of the part of the treetable consisting of columns 13 through 23, as shown in FIG. 12. Column headers 2970 in the control line 2910 head the 23 columns of treetable 2955 and allow for selection of a particular column.

FIG. 11 illustrates the result of extracting a part of a treetable representing a subtree into an auxiliary display. In this example the extracted treetable 3055 represents the subtree headed by the node represented by cell 2930 shown in FIG. 10. Because FIG. 11 shows a part of the treetable 2955 shown in FIG. 10, the same reference numerals will be used to denote the same features shown in FIG. 10. In control line 2910, focus selection 2020, read selection 2030, size selection 2040, and extract title 2960 are present along with tree selection 2920. However, column selection 2950 is missing, indicating that further subtree extraction is possible, but not further extraction by column ranges. Column headers 2970 include only headers for columns C1 through C10 of the original treetable 2955 shown in FIG. 10, because those are the only columns spanned by the cells representing nodes of the selected subtree. Row note 3010 is used to indicate which rows of the original treetable have been omitted, in this example only row R1; rows R2–R11 are all shown. The extracted treetable 3055 consists of cell 2930 shown in FIG. 10, and all cells below it in that Figure.

FIG. 12 illustrates the result of extracting a part of a treetable consisting of a column range into an auxiliary display. In this example the extracted treetable 3155 consists of the column range C13 through C23 of treetable 2955 shown in FIG. 10. Because FIG. 12 shows a part of the treetable 2955 shown in FIG. 10, the same reference numerals will be used to denote the same features shown in FIG. 10. In control line 2910 the focus selection 2020, read selection 2030, size selection 2040 and extract title 2960 are present along with tree selection 2920. However, column selection 2950 is missing, indicating that subtree extraction is possible, but not further extraction by column ranges. Column headers 2970 include only headers for columns C12 through C23 of the original treetable 2955 shown in FIG. 10. The extracted treetable 3155 consists of all cells shown in columns C12 through C23 of FIG. 10. Some of the cells shown in column 12, specifically cells 2925, 2931, 2932, 2933, have labels prefixed by indicators 2934(in this example in the form of boldface disks) indicating that in the base treetable 2955 the cells extend to the left beyond the selected column range.

Figure 13:
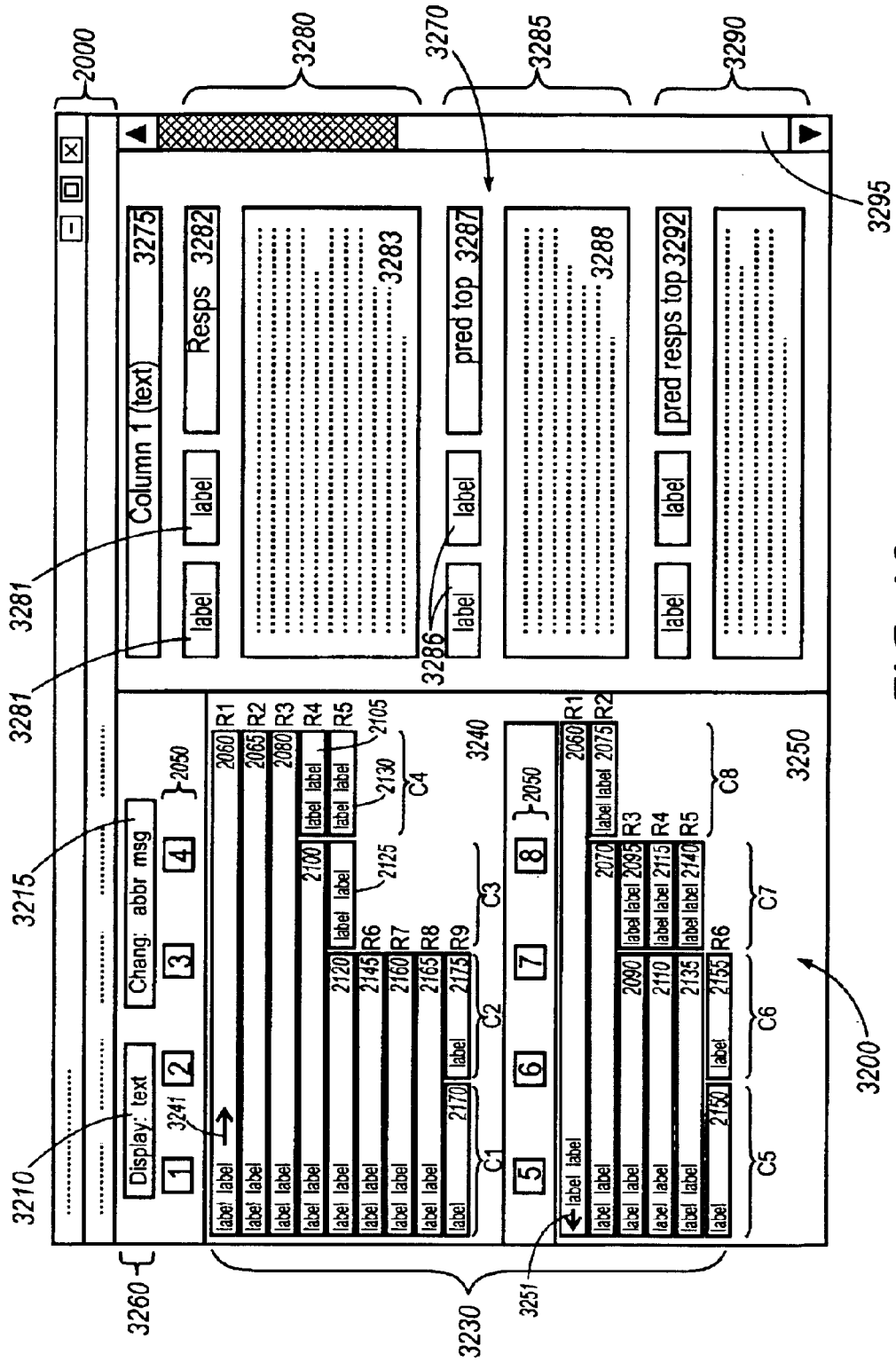
FIG. 13 is a dual-frame treetable display.
Figure 14:
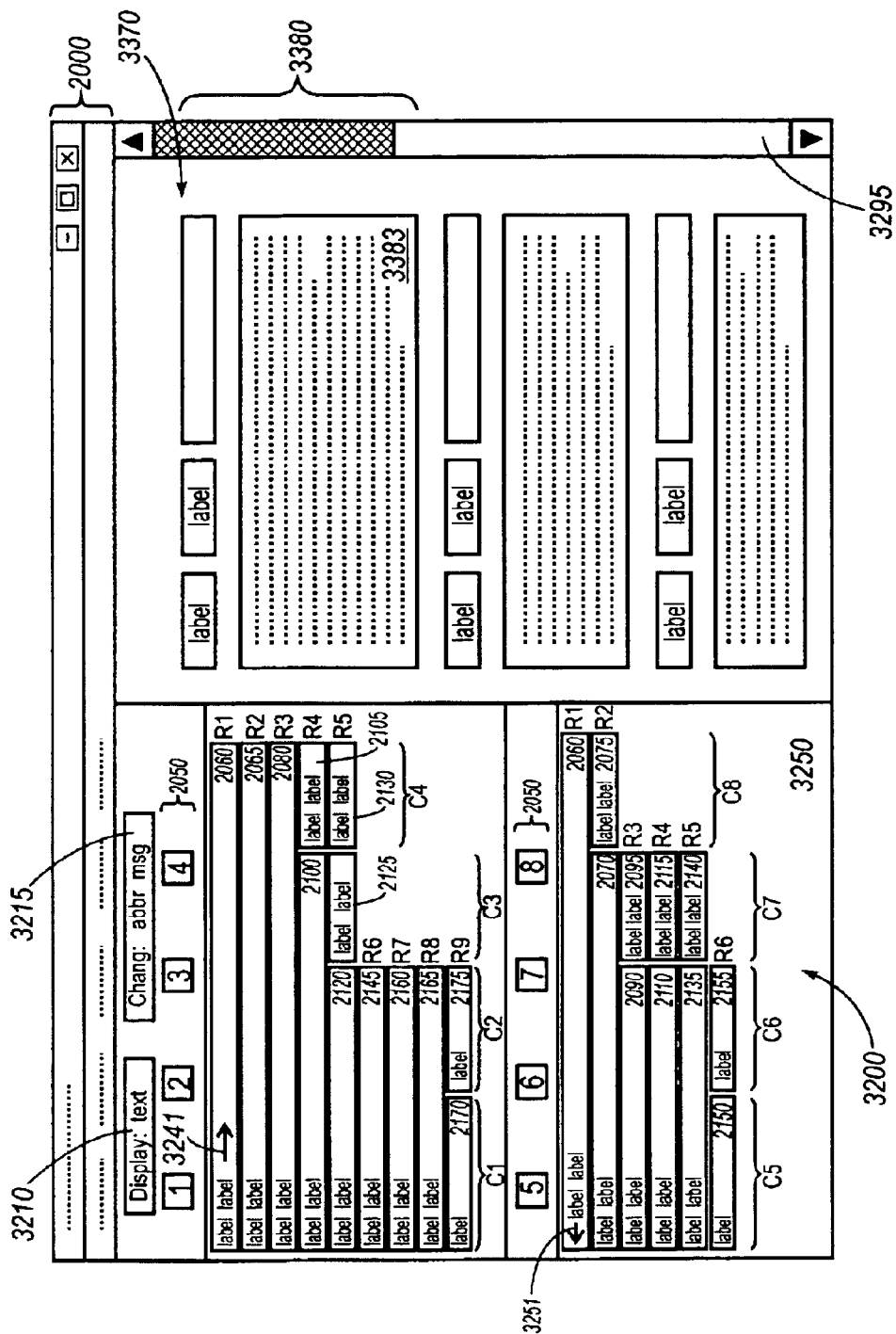
FIG. 14 is the dual-frame treetable display of FIG. 13 with the focus shifted to another column.
Figure 15:
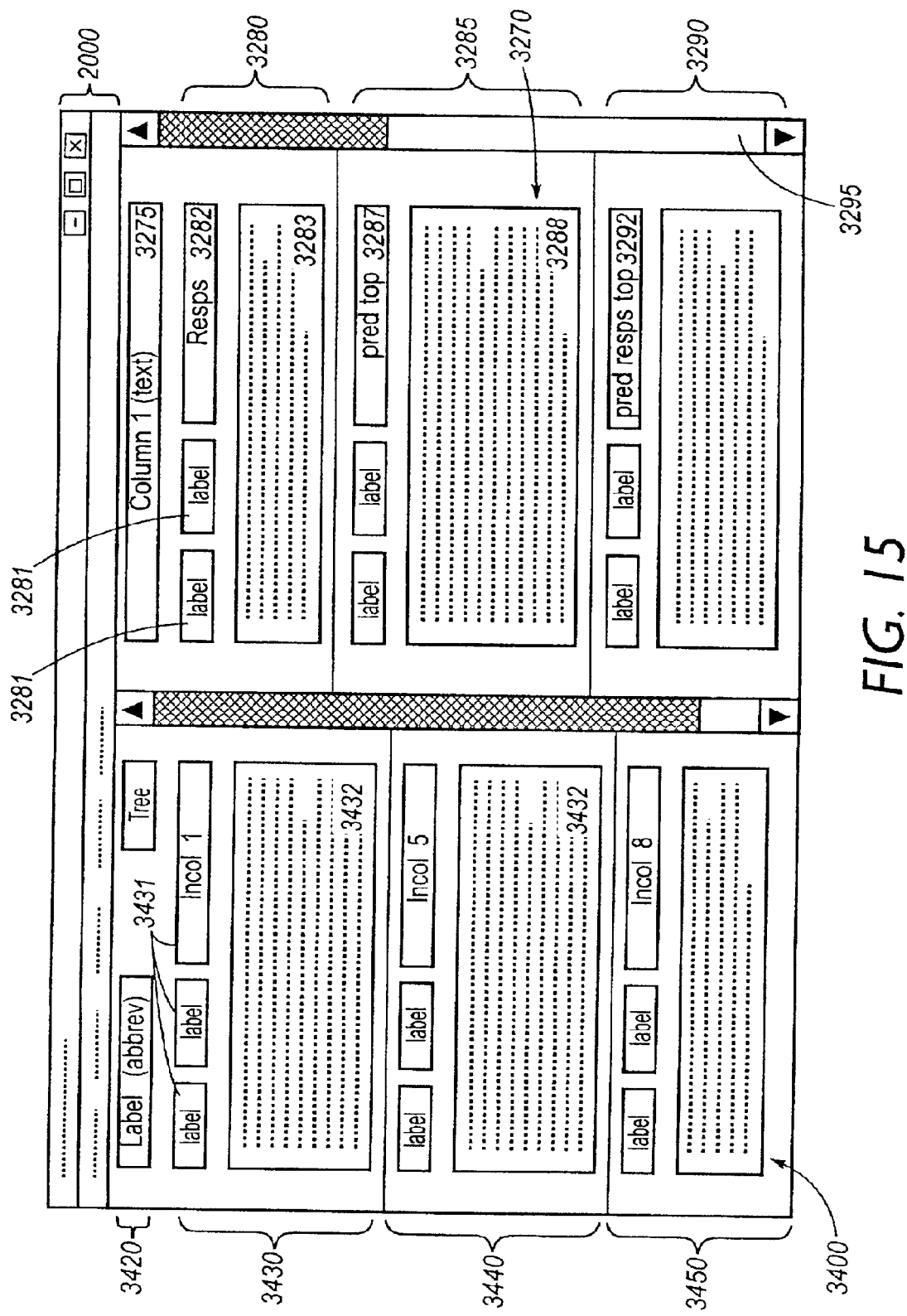
FIG. 15 is the dual-frame treetable display of FIG. 13 with the left-hand frame used to display the children of a node.

FIGS. 13 through 15 illustrate another embodiment using a dual-frame approach to treetable exploration. In this approach, the treetables are not susceptible to in-situ expansion, but, rather, are used only as navigation guides to the reading of the content associated with groups of nodes represented by the treetable cells. FIG. 13 shows an initial dual-frame view of the treetable of FIG. 1, containing a guide frame 3200 and a reading frame 3270. Guide frame 3200 contains a mode control line 3260 consisting of a display mode 3210 and a change selection 3215. The display mode 3210 indicates the mode currently governing what is displayed in reading frame 3270 when a selection is made of a column label or cell in divided treetable 3230. As this is a divided treetable 3230 there are also two column selections 2050, one for each part of the divided treetable 3230. In this example the display mode is "text", but it may be any one of "text", "abbr", or "msg". In "text" or "abbr" modes, when a column or cell is selected in divided treetable 3230, the concatenated bodies, which may be texts or other information as disclosed earlier, associated with nodes represented by cells in the leftmost column spanned by the cell are displayed in reading frame 3270. In "text" mode the body information is not abbreviated. However, in "abbr" mode the same information is made available in abbreviated form. In "msg" mode, only the body associated with the node represented by the selected cell is displayed. Alternative embodiments may include only a single mode, a subset of these display modes, or alternative modes, and, of course, the modes may be expressed differently. For instance, if the body information includes graphical, audio, or other types of information, alternative commands appropriate to those types of information may be appropriate. Alternatively, textual information may be supplied in summarized forms if desired, or with key words highlighted. Change selection 3215 allows the current display mode to be changed. The choices given are the available alternatives to the current display mode. In this example they are "abbr" and "msg".

The divided treetable 3230 is a treetable vertically partitioned into subtables to fit within the allocated horizontal space. In this example, 4 columns are used as the maximum number of columns in a subtable, resulting in the subtables 3240 and 3250. However, the maximum number of columns in a subtable may vary based on the available display space, the font sizes used in the labels, the display resolution, and other factors. Therefore treetable 3230 may be shown as a single treetable or as a divided treetable having any number of subtables which are appropriate. Because divided treetable 3230 represents the same tree as that represented by treetable 2055 shown in FIG. 1, the column headers and cells of divided treetable 3230 are labeled in the same way as the column headers and cells shown in treetable 2055 of FIG. 1. A cell may span columns in more than one subtable. When this occurs, the cell is shown in all the subtables containing columns spanned by the cell. In this example, cell 2060 spans columns C1–C4 of subtable 3240 and columns C5–C8 of subtable 3250 and appears in both subtables. When a cell is split in this way, continuation marks such as right arrow 3241 and left arrow 3251 may be used within the cell to indicate the continuation direction or directions.

Either a column label 2050, or a cell in a subtable of divided treetable 3230, may be selected to indicate the information to be shown in reading frame 3270. In either case, if the display mode 3210 is "text" or "abbr", the material shown in reading frame 3280 is associated with a column. If a cell of a subtable is selected, the column involved is the leftmost column containing that cell in that subtable. In the example of FIG. 13, cell 2060 of subtable 3240 has been selected, and the selection may be indicated by highlighting in any of the manners discussed hereinbefore. The column involved is the leftmost column containing cell 2060 in subtable 3240, in this example column C1, which may also be indicated by highlighting as discussed hereinbefore. Cells of the guide frame 3200 not in a selected column may be dimmed for purposes of contrast.

Reading frame 3270 is used to display the body information associated with the current selection made in guide frame 3200. Reading frame header 3275 shows the column number of the column being displayed, in this example "Column 1" indicating column C1. The display mode currently in effect, in this case "text" is also shown in reading frame header 3275. The reading frame header 3275 is followed by a sequence of elements, such as elements 3280, 3285, and 3290. Element header 3281 contains the labeling information for element 3280, which is the first cell of the column being displayed, cell 2060. Additional information may also be included, for example a date and time. View control 3282 allows requests for alternative temporary replacements for the guide frame 3200 by other information related to the tree node associated with the element. In this example, view control 3282 allows only a request that the material associated with the children ("resps") of the node associated with element 3280 be displayed in the left hand frame, temporarily replacing guide frame 3200. An example of such replacement is shown in FIG. 15. In an alternative embodiment the "resps" request might result in the children of the node associated with element 3280 to be displayed in a separate window. Other view controls, such as view control 3287 and view control 3292, may allow other requests suitable to the type of node represented by the element. For example, view controls 3287 allows a request for material associated with the parent ("pred") of the node associated with element 3285 to be displayed in the left hand frame or the reading frame to be scrolled to the top ("top"). View control 3292 contains both the "resps" selection shown in view control 3282 and the "pred" and "top" selections shown in view control 3287. Additional view controls may be added if appropriate. For instance a view control may be added which provides scrolling to the next element, if desired. Other controls might include switching between a summarized content for body 3283 and a complete unabridged content.

Element body 3283 follows element header 3281, and contains information such as text, graphics, etc., associated with the tree node represented by the element. In this embodiment the material consists of the content of the message associated with the tree node. Also, because element 3280 corresponds to selected cell 2060, element body 3283 may be highlighted in any of the ways discussed hereinabove. Element 3280 is followed by element 3285. Element header 3286, like element header 3281, contains labeling information for the associated cell, in this example cell 2065, and view control 3287. Body 3288 likewise contains the information associated with the tree node, cell 2065. A scroll bar 3295 is also provided to allow the user to scroll through the content of reading frame 3270.

FIG. 14 illustrates a dual frame treetable view for the same treetable as that of FIG. 13, but with a different selected cell. Because the divided treetable shown in FIG. 14 is the same as that shown in FIG. 13, the same reference numerals will be used to denote the same features. The selected cell of FIG. 14 is cell 2070 in subtable 3250, which spans columns C5–C7 in row R2. Cell 2070 may be highlighted, as discussed hereinabove, to show the selection, with the other cells in the leftmost column C5 highlighted another way. The remaining cells in the divided treetable may then be dimmed. Reading frame 3370 is similar in structure to reading frame 3270 of FIG. 13, but contains material associated with column C5 of divided treetable 3230. Also, because cell 2070 is the selected cell of that column, the reading frame is initially scrolled to element 3380, containing material associated with the node represented by cell 2070. Body element 3383 may be highlighted to match the highlighting of cell 2070.

FIG. 15 illustrates another embodiment which uses the dual frame treetable views for exploring other material associated with the tree represented by the divided treetable and using the view controls in the reading frame. It consists of a left-hand auxiliary frame 3400 and a right hand reading frame 3270. Because the right hand reading frame shown in FIG. 15 is the same as that shown in reading frame 3270 of FIG. 13, the same reference numerals will be used to denote the same features. In this example the additional material being examined consists of texts associated with the children of a node whose text is being viewed in the reading frame. In FIG. 15, it is assumed that the user has just selected view control 3282, requesting that material associated with the children of the node represented by element 3280 of reading frame 3270 (and cell 2060 of guide frame 3200 of FIG. 13) be displayed in the left hand frame, temporarily displacing guide frame 3200 of FIG. 13. Auxiliary frame 3400 therefore appears in the left-hand frame. Auxiliary frame 3400 consists of a header 3420 which (a) indicates the label of the cell (and reading frame element) for which the children are being displayed, in this case cell 2060 and reading frame element 3280, (b) indicates the form of the display ("abbrev"), and (c) provides a control ("back to tree") for requesting that guide frame 3200 be restored. Because this example concerns an email application, the header 3420 may also refer to "responses" or "children". Following header 3420 are the child elements, such as child elements 3430, 3440, and 3450, containing information associated with the children of the node associated with cell 2060. Child header 3431 contains label information for the cell representing the first child of the node associated with reading frame element 3280, specifically cell 2065 of FIG. 13, and a shift control ("incol 1"), and may contain other information. Selection of the shift control causes the guide frame 3200 to again be displayed in the left-hand frame, but with the selection altered to cell 2065 and column C1. Child headers may also contain additional information, such as the dates, and the shift controls may differ in spelling and meaning. Child body 3432 follows child header 3431 and contains the text associated with the node represented by the cell whose label appears in child element header 3431, in this case cell 2065. It should be noted that the text may be supplied in a summarized or abbreviated form and that controls may be supplied for switching between summarized or abbreviated text and full text.

Figure 16:
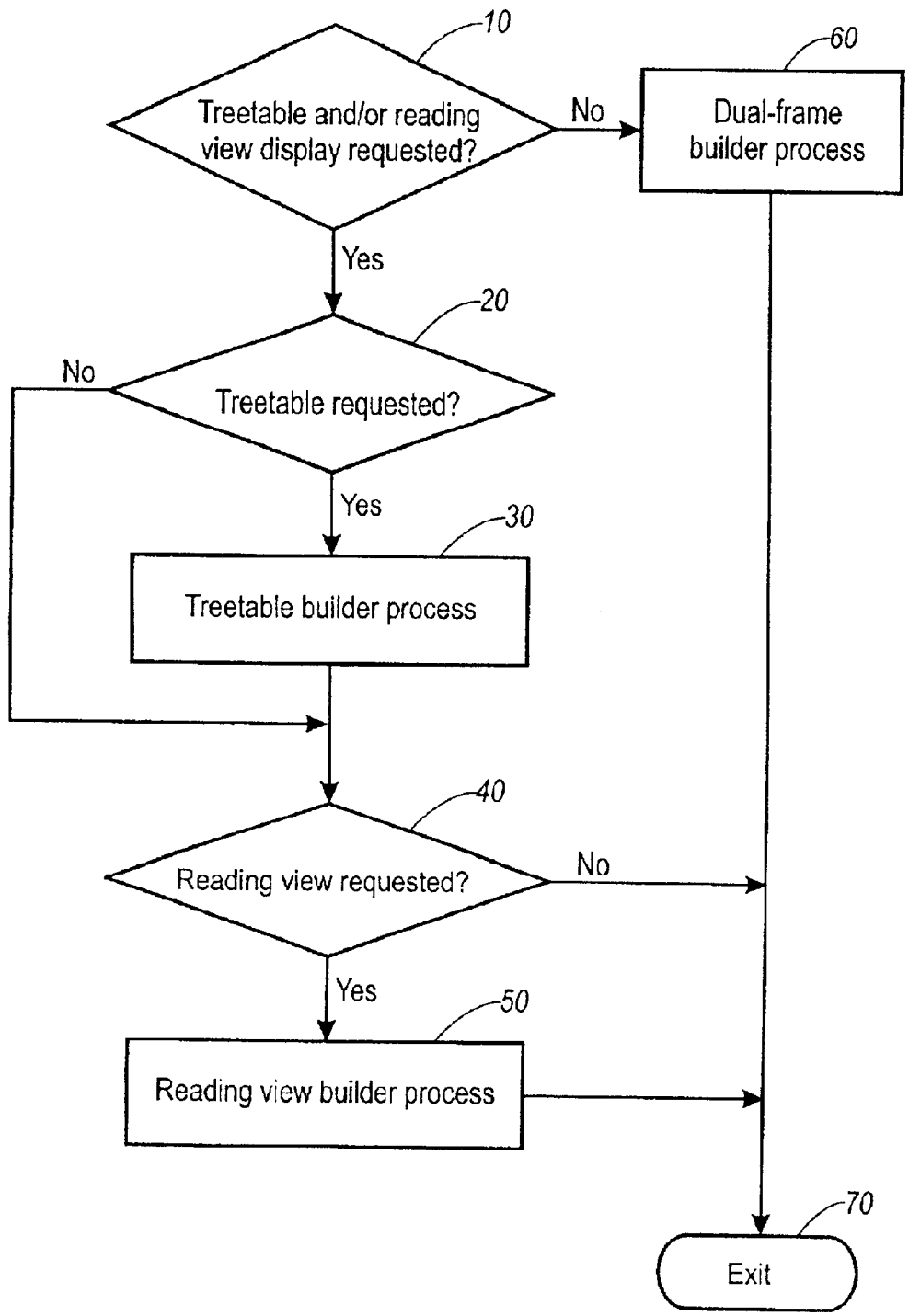
FIG. 16 is a flow diagram of the major processing steps in treetable and auxiliary display production.

Now moving to the methods for developing these visualizations, FIG. 16 illustrates an overall control mechanism referencing the major processes used by embodiments of this invention. Many contemporary variations in the production of interactive visualizations exist, each of which would cause some differences in how the major processes are invoked, and in details of the display specifications produced. Some sources of variation are:

(a) The language used to express display specifications, e.g., to specify the structure and content of the treetable visualizations. This may be HTML or one of its variants, or it may be programming-language specific (e.g., JAVA swing), or some combination of the two.

(b) Whether the displays are structured so that each selection of a table item or control requires a separate interaction, or whether several interactions are bundled together (e.g., in a "form").

(c) Whether the interaction is stateless or session-based. In stateless interactions, typical of browsers, a new process, with no prior knowledge about the sequence of prior interactions (except that conveyed in the request), handles each visualization request.

(d) Whether each window used for the visualizations is managed by a separate, independent process (a basic mode of operation of browsers), or a single application manages all the windows involved.

(e) Whether the control mechanism is implemented on a single system including the display system or on a separate system from the display system. For instance, a user may interact through a browser with a remote website or in other distributed computing frameworks.

(f) Whether a single tree is being viewed or whether multiple trees are being viewed. If multiple trees are being viewed it may be desired to insert a dummy parent node for which all the trees will be subtrees of and process as if there were only one tree. Alternatively, it may be desired to process each tree independently and concatenate the display information to produce a single display image.

However, whatever general mechanism is used to produce the interactive visualizations, the methods provided by this invention would be essentially the same, varying, for the most part, in details of how the major processes are invoked, and in how requests and resulting display specifications are expressed.

The control routine enters at decision box 10, where a check is made as to whether a treetable and/or an auxiliary reading view has been requested. If so, the control routine then moves to decision box 20, where a check is made as to whether a full treetable display has been requested. If so, it moves to box 30 to build the treetable display, which is discussed in detail in FIG. 17. After building the treetable display, the control routine moves to decision box 40, where a check is made if a reading view has been requested. If a full treetable display has not been requested, the control routine skips the step of building a treetable and moves directly to decision box 40 and checks whether an auxiliary reading view has been requested. If so, it moves to box 50 to build the reading view and then to exit box 70. The reading view builder process is discussed in detail in FIG. 30. If a reading view has not been requested, it moves directly to exit box 70. However, if, at decision box 10 the control routine finds that a full treetable display has not been requested, and a dual-frame treetable display is needed, it moves to box 60 to build the dual frame treetable view, and then to exit box 70. The dual-frame builder process is discussed in detail in FIG. 27.

Figure 17:
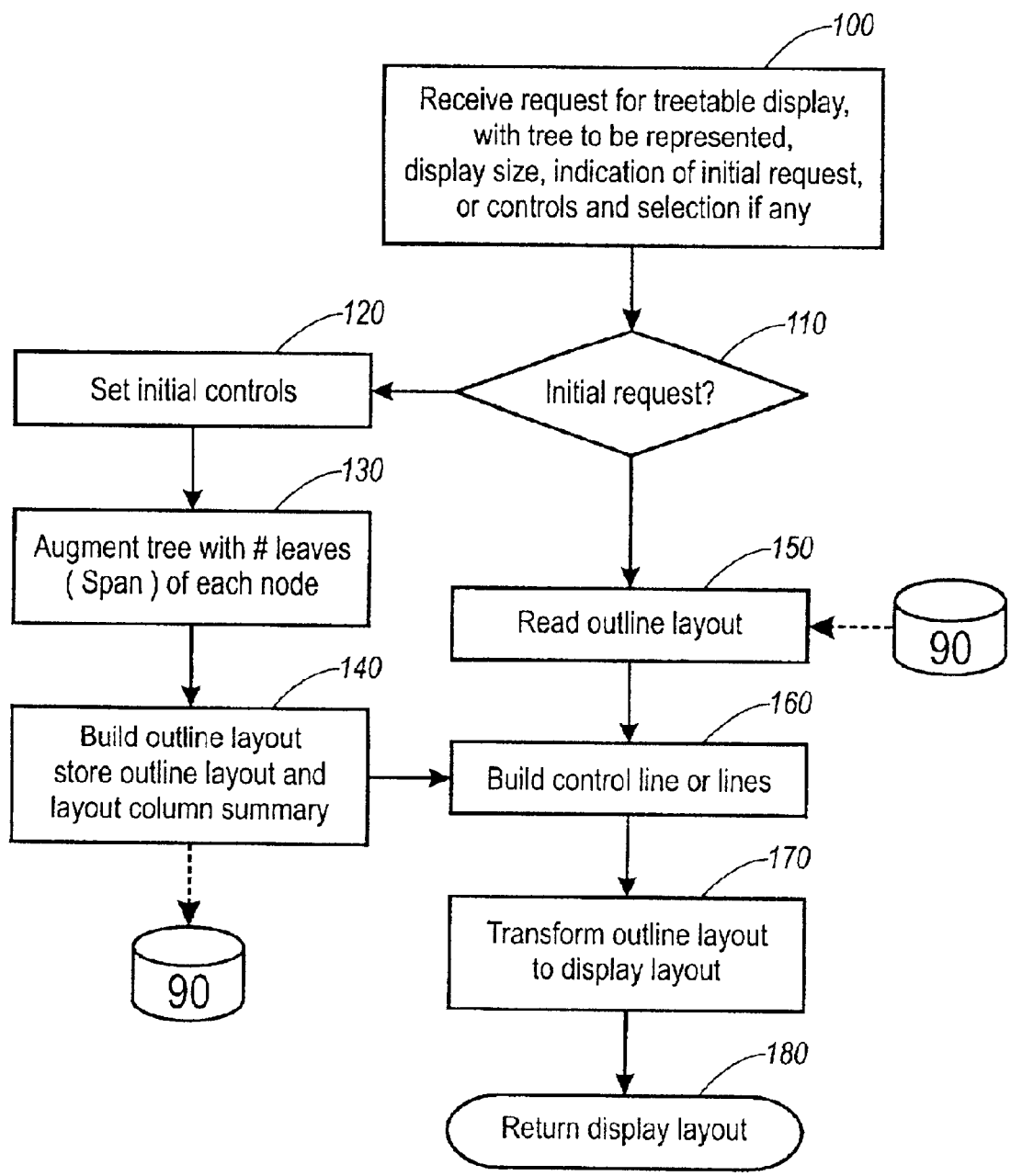
FIG. 17 is a flow diagram of the general treetable construction process.

FIG. 17 describes the overall treetable builder process. The control routine is entered at box 100 with an input tree and the current set of display controls, if any, and continues to decision box 110. At decision box 110 the control routine checks whether this is an initial request for a treetable display of the associated tree. If this is an initial request, it performs some preprocessing starting at box 120. At box 120 an initial set of values is associated with the controls. Then, at box 130, preparation for further processing is made by augmenting the input tree with a span value for each node. The span value is 1 for leaf nodes, and for other nodes, the span value is the number of leaves that are the ultimate descendants of the node. A simple, depth-first process finds the span values. For each node n, after all its children have been processed, its span is set as the sum of the span values of those children. After setting the span values, the control routine then moves to box 140 where it produces an outline layout for the treetable. The outline layout production process is discussed in more detail with respect to FIG. 18. The outline layout, as well as a summary listing of the items in each column, is then saved for subsequent use in storage device 90. Storage device 90 could be any medium permitting the saved information to be accessed after the process creating the information has terminated. It should be noted that the outline layout and the summary listing of the items in each column is saved to avoid regenerating the information each time it is needed, however, it should be obvious that the outline layout and the summary listing of the items in each column could be generated each time the information is used rather than retrieved from storage device 90. The same is true for any other part of the process where data or information is retrieved from a storage device or memory. The outline layout is a treetable skeleton in which each tree node has been associated with a cell in a particular row, with a particular starting and ending column, and the spaces between tree-node-associated cells have been filled with gap cells. Gap cells are cells with no content. The gap cells maintain the table geometry, and are ultimately displayed in a way that renders them indistinguishable from the background. The outline layout can be represented by a simple list whose elements represent rows, and consist of a list of the cells within that row. After saving the outline layout and summary information, the control routine continues to box 160 to build the control line.

If, however, the check at decision box 110 determines that this is not the initial request for a treetable for the specified tree, the control routine moves to box 150 where the stored outline layout is read from storage device 90 before continuing to box 160. At box 160 the header elements for the display are produced showing the current and other possible control choices, such as those illustrated in FIG. 1 or FIG. 10. The control routine then moves to box 170, where the outline layout is further transformed into a display layout, that is, a layout specification suitable to a particular display processor (e.g., a browser if a browser is being used), in which the cells have been given specific dimensions and colors or other types of background fill, and filled with specific information and links. The transformation of an outline layout to a display layout is discussed in more detail hereinafter with respect to FIG. 20. Finally, the control routine moves to box 180 where the resulting display layout is then returned to the invoker of the process.

Figure 18:
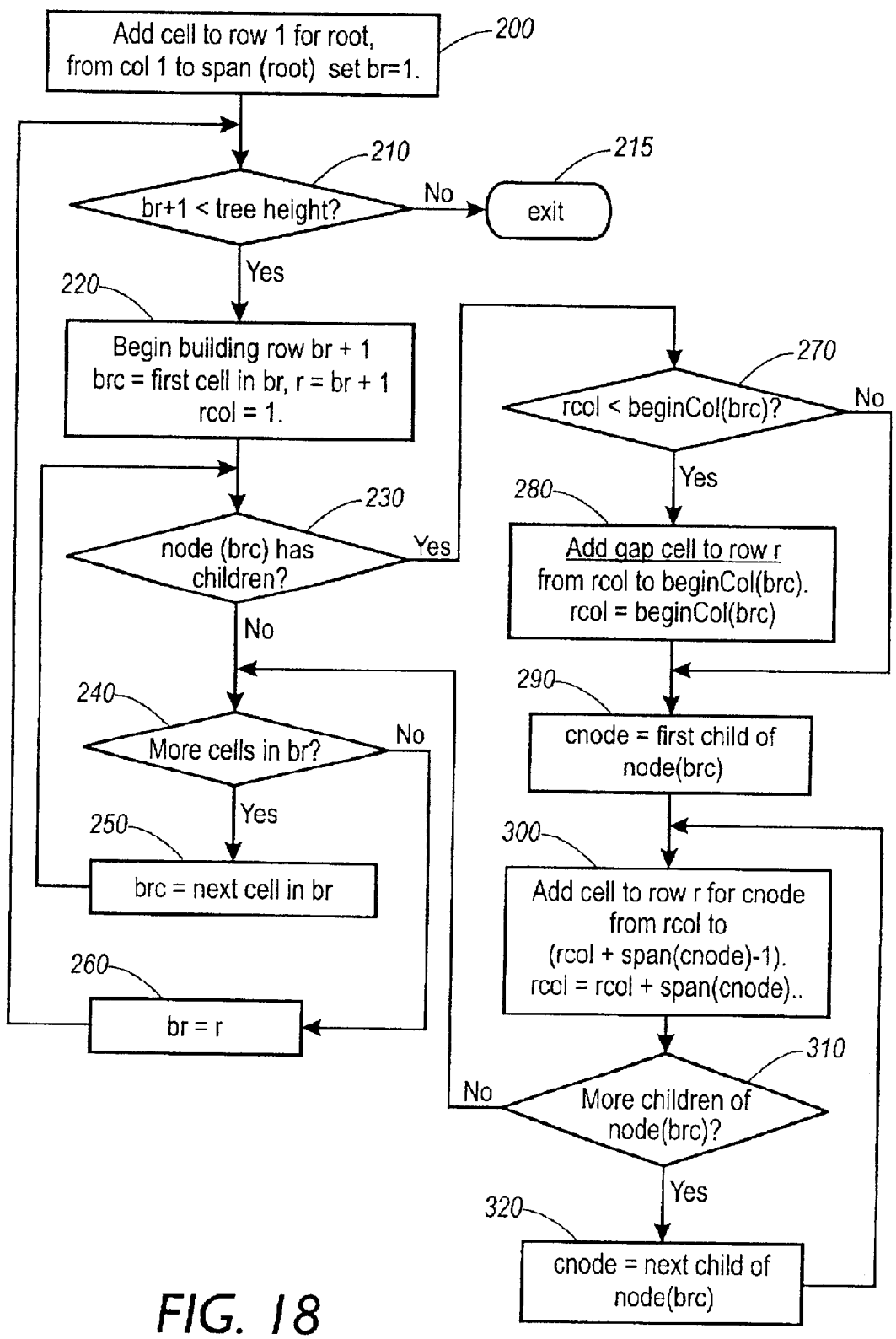
FIG. 18 is a flow diagram of the outline layout construction step of the general treetable construction process.
Figure 19:
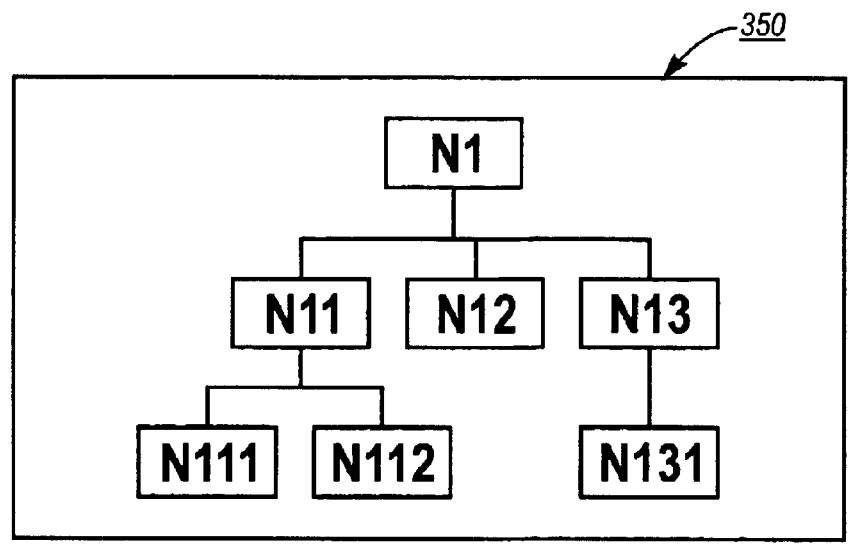
FIG. 19 is an illustration of an outline layout while under construction.
Figure 19:
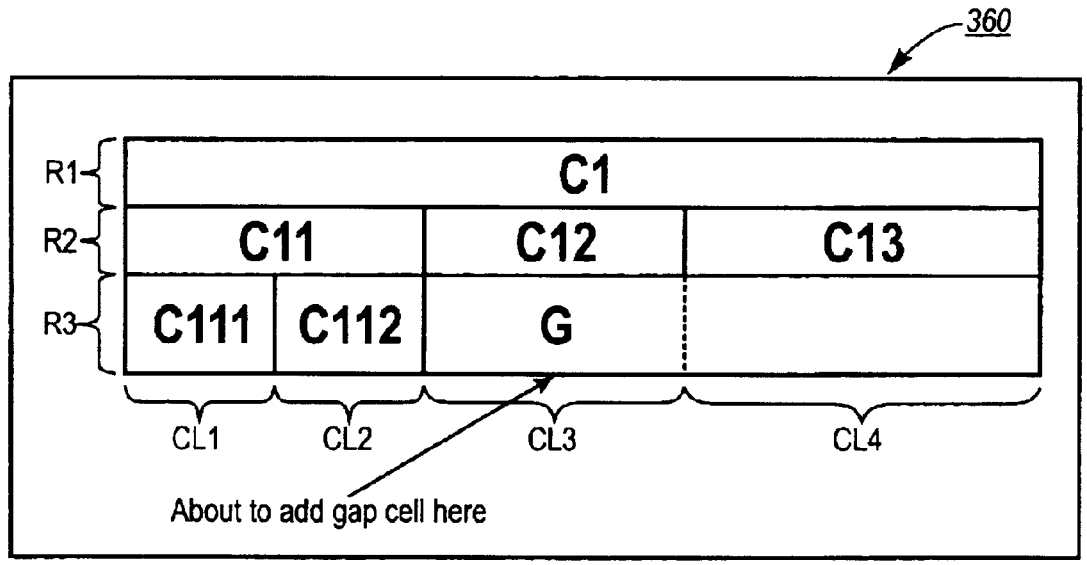

FIGS. 18 and 19 describe building an outline layout in which each tree node has been associated with a cell in a particular row, with a particular starting and ending column, and the spaces between tree-node-associated cells have been filled with gap cells. The general approach used is illustrated in FIG. 19, with tree 350 representing an input tree, with root node N1, interior nodes N11, N12, and N13, and leaf nodes N111 N112 and N131. Outline layout 360 represents an outline layout under construction, with cells C1, C11, C12, C13, C111, and C112, three rows R1, R2, and R3, and columns CL1.CL2, CL3, and CL4.

First, cell C1 is allocated for the root node N1 of the tree. Cell C1 spans all columns CL1–CL4 in the entire first row R1. Then each subsequent row is developed based on the content of the preceding row. In outline layout 360, row R2 contains cells C11, C12, and C13, while row R3 is under construction based on row R2. Cells C111 and C112 have been allocated to represent the children of node N11 and are placed directly beneath cell C11. The next substantive cell to be allocated is cell C131, representing node N131, and must begin directly under cell C13. But, before this is done, a gap cell G is needed to bridge the gap between cells C112 and C131. Once gap cell G has been placed then cell C131 can be allocated.

The control routine specified in FIG. 18 carries out this approach. It begins at box 200, where a single cell is allocated in the initial row of the table, corresponding to the root of the tree. The cell starts at column 1 of the table, and extends n columns, where n is the span value of the root. The initial row is set as the initial value of "base row" variable br. Control then passes to the decision box 210, which is the initial step of a loop, each iteration of which builds a single row. In decision box 210 the control routine checks whether there are any further rows to be built and, if not, it exits on box 215 and returns control to its caller. If there are further rows to be built, the control routine continues at box 220, where it initializes processing for the next row by setting the value of the "base row cell" variable brc to the first cell in the row indicated by variable br, the value of the new row variable r to br+1, and the current column to 1, and continues to box 230.

At decision box 230, a check is made as to whether the node represented by the current base row cell brc has any children. If not, it continues to decision box 240. At box 240 the control routine checks whether there are any more cells in the base row referenced by variable br. If so, it continues to box 250 where it updates variable brc to the next cell in the row referenced by variable br, and returns to box 230. If not, the base row variable br is updated to reference the current row (the one just built), and the control routine returns to box 210 to build the next row.

However if the check at decision box 230 determines that the node corresponding to the current base row cell brc does have children, the control routine continues to decision box 270 to add representatives for those children in the new row. At box 270 a check is made as to whether the value of the current column position variable rcol is equal to the column position of brc, so that a new cell allocated at position rcol will be aligned under the parent. If so, it continues to box 290. If not, it continues to box 280 to add a "gap" cell to the current row to span the distance between the current column position in the row and the start column of the cell referenced by variable brc, and then to update the value of rcol, before continuing at box 290. At box 290 the current child node variable "cnode" is set to the first child of the node represented by cell brc, and then a loop consisting of boxes 300 through 320 is entered to sequentially add cells for each such child, giving them outline widths equals to the respective spans of their associated tree nodes, until it is found, by the test at box 310, that the children of the node represented by cell brc have been exhausted, and control returns to box 240.

Figure 20:
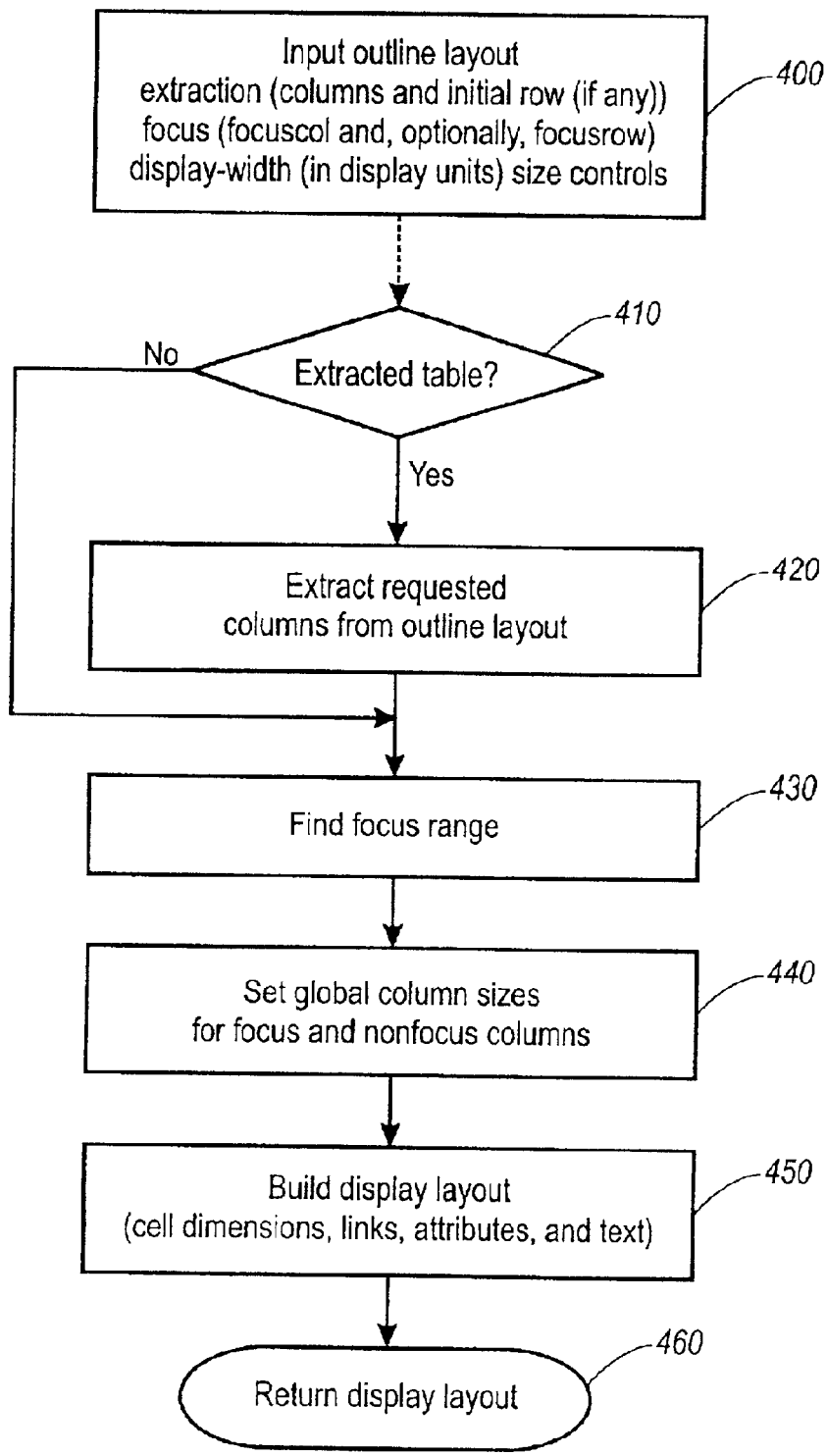
FIG. 20 is a flow diagram of the transformation from outline layout to display layout

FIG. 20 covers the general process of transforming an outline treetable layout into an actual display specification from box 170 in FIG. 17, taking into account variations in focus when given. Box 400 represents the input to the process, including the outline layout, an optional extraction specification (indicating whether this treetable is to be extracted from a larger layout), an optional focus (consisting of a column and possibly a row), a target display-width, and size controls (see FIG. 1).

Given this input, the control routine first checks, at decision box 410, whether the input includes an extraction specification. If so, it moves to box 420 where it forms a temporary outline layout for the process by extracting the requested columns, and then continues to box 430. If, however, the check at box 410 determines that no extraction is needed, it moves directly to box 430. At box 430, discussed hereinbelow in more detail with respect to FIG. 21, the focus column range, that is, the set of consecutive columns which are in focus, if any, is identified. Next, in box 440, discussed hereinbelow in more detail with respect to FIG. 22, the column range, together with the display-width and size controls, is used to assign a specific width, in display units, to each column. Finally, in box 450, discussed hereinbelow in more detail with respect to FIG. 24, the actual display layout specification is produced, implementing the cell widths implied by the column widths, and specifying the content for each cell. The content for each cell is based on information associated with the represented tree nodes, focus information, and the available space within the cell.

Figure 21:
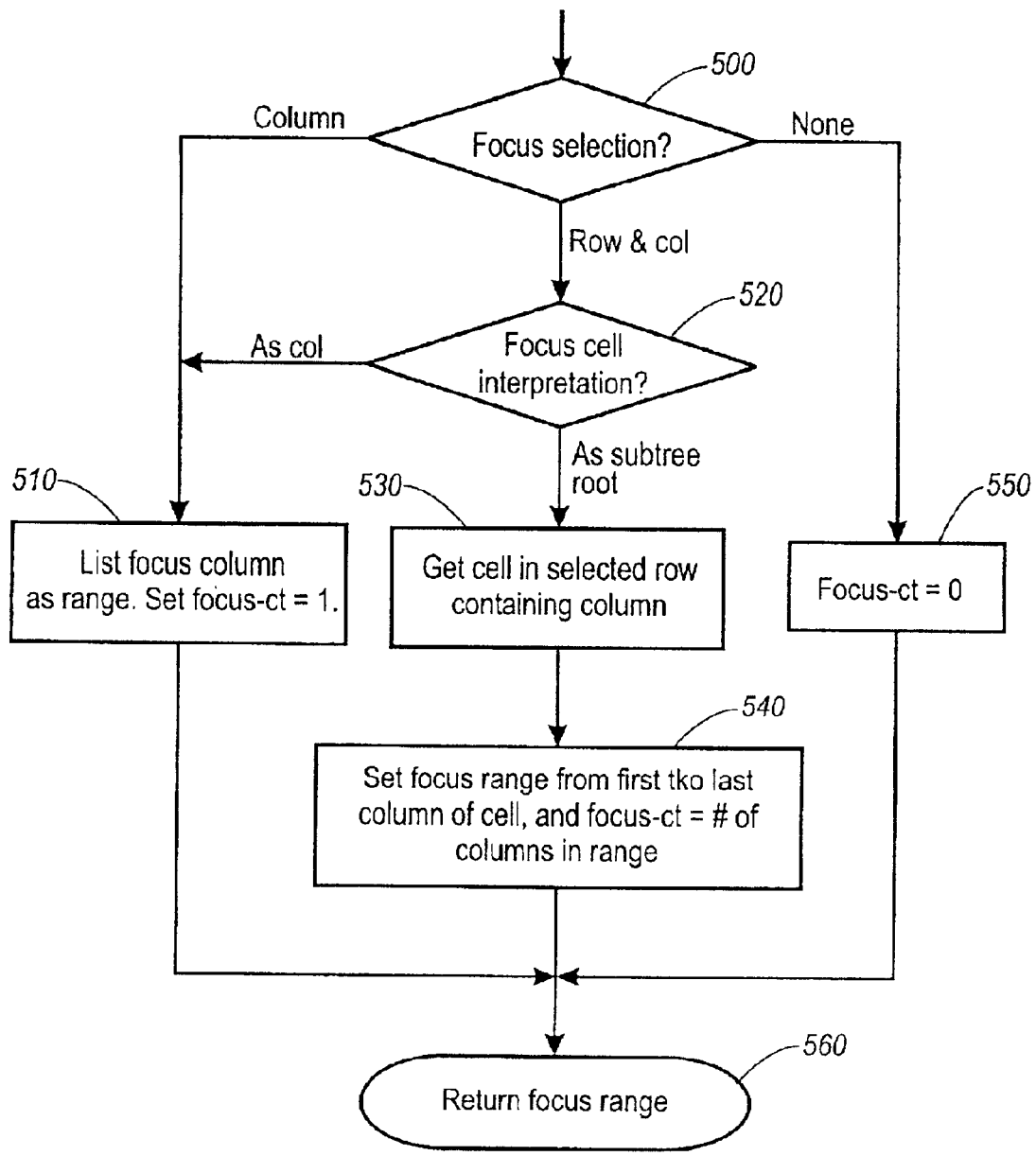
FIG. 21 is a flow diagram of the method for finding the focus range

FIG. 21 details the process of box 430 of FIG. 20, in which the focus column range, if any, is identified. In decision box 500 the control routine checks the current focus elements. There may be no current focus element, or there may be a focus column, or both a focus column and a focus row. If there is no focus element, the control routine moves to box 550 to set the focus count to 0, and then proceeds to box 560 to return the empty focus range. If there is only a focus column, the control routine continues at box 510. At box 510 the focus range is set to the single focus column, the focus count is set to one, and the control routine returns the focus range at box 560. If, however, the check at box 500 indicates that there is both a focus column and a focus row, i.e., that a cell in the focus row beginning at the focus column has been selected, the control routine proceeds to box 520 to determine how the selection is to be interpreted. If, at box 520, it is determined that the selection is to be interpreted as placing the first column containing the indicated cell into focus, the control routine moves to box 510 to set the focus count and focus range as if only that column were specified. Otherwise, the control routine continues to box 530 to obtain the cell in the outline layout in the focus row beginning at the focus column and continues at box 540. At box 540 the focus range is set to the specific columns spanned by the cell and the focus count is set to the number of such columns, and then the control routine proceeds to box 560 to return the focus range.

Figure 22:
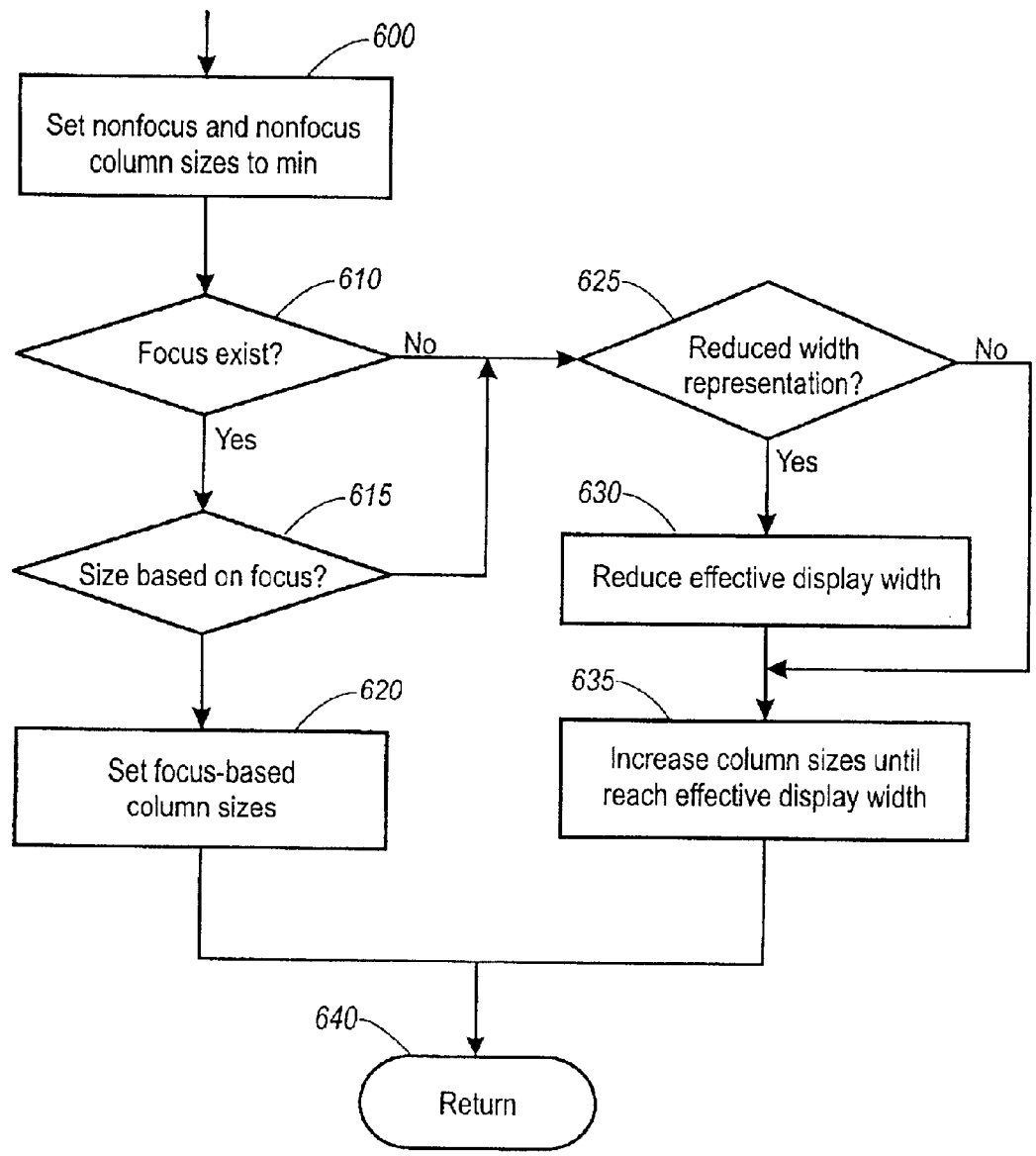
FIG. 22 is a flow diagram of the method for setting the column widths of the display layout.

FIG. 22 details the process of box 440 of FIG. 20, in which specific widths (in display units) are assigned to focus and nonfocus columns, based on the given display width, the focus range, and size controls. In the initial box 600, the control routine sets the initial sizes of both focus and nonfocus columns to a minimum (a size sufficient only to hold a single character plus a boundary), and proceeds to box 610. In decision box 610 the routine checks whether there is at least one focus column. If there are no focus columns, the routine proceeds to decision box 625. If there is at least one focus column, the control routine proceeds to decision box 615 where it checks whether the controls specify that the focus is to be taken into account in assigning column widths (in some cases, it may not be, e.g., with the focus indicated on the display only by highlighting). If the focus is not to be considered, the control routine proceeds to decision box 625. If the focus is to be considered in assigning column widths, the control routine proceeds to box 620, discussed in more detail hereinbelow with respect to FIG. 23, to set column widths based on differentiating between focus and non-focus sizes, and then proceeds to box 640 to return and build the display layout in box 450 of FIG. 20.

At decision box 625, entered in cases where either there is no focus, or the focus is not to be taken into account in assigning column widths, a check is made as to whether the size controls indicate the effective display width, that is, the display width to be assumed in assigning column widths. The effective display width could be reduced, for instance, to produce a narrower treetable display. If so, the control routine proceeds to box 630 to reduce the effective display width, and continues to box 635. If, however, the effective display width is not to be reduced, the control routine moves directly to box 635. At box 635 the control routine increases the uniform column width until the effective display width is filled, and then returns at box 640 and builds the display layout as indicated in box 450 in FIG. 20.

Figure 23:
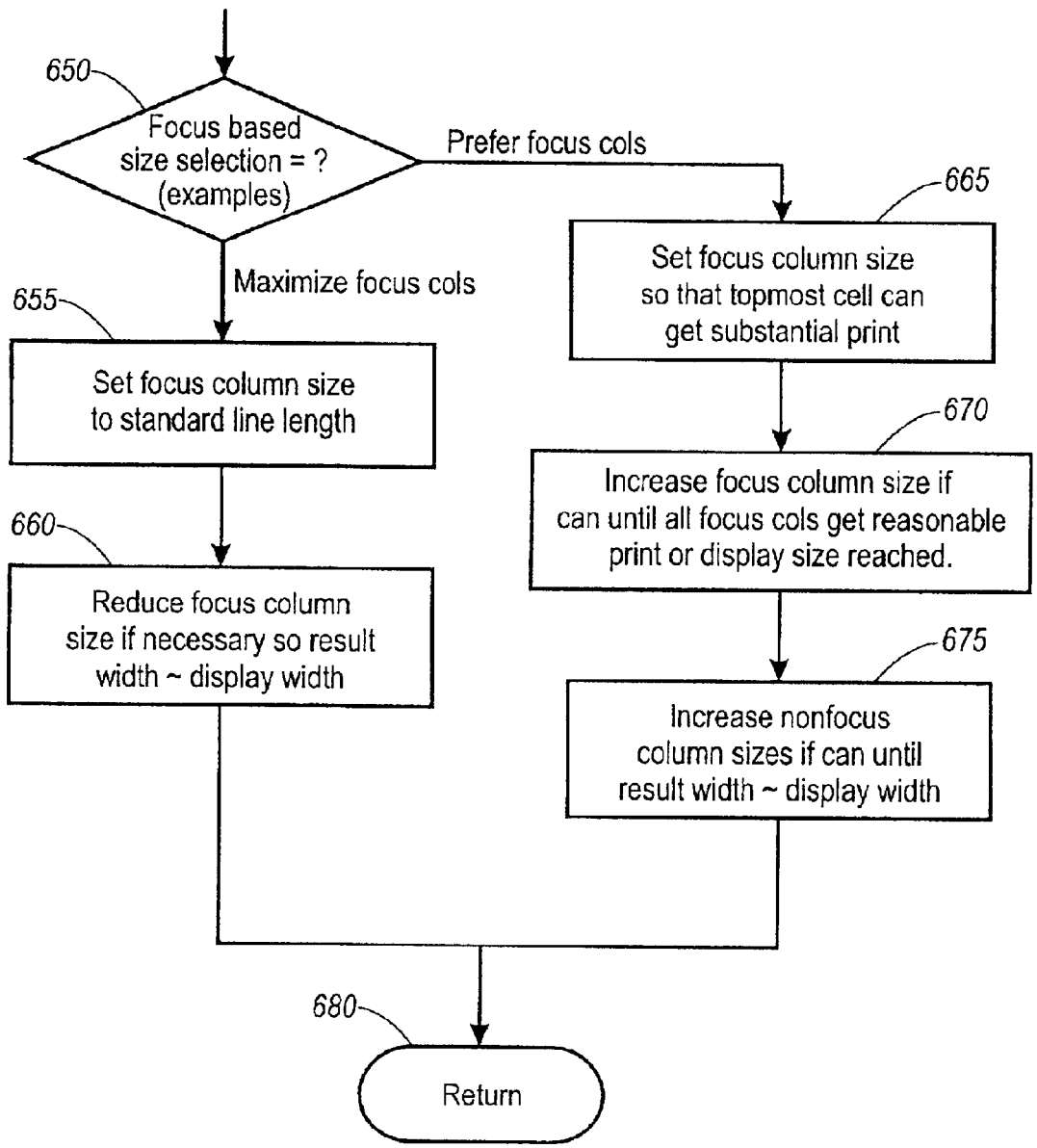
FIG. 23 is a flow diagram of the method for setting focus-based column widths of the display layout.

FIG. 23, which discusses in detail box 620 of FIG. 22, describes the assignment of possibly different widths to focus and non-focus columns. The control routine enters at decision box 650, where it checks what kind of size emphasis is requested for focus columns. If it finds that focus columns are to be maximized, the control routine proceeds to box 655 where it sets the focus column sizes to a standard length and then continues to box 660. There it reduces the focus column sizes if necessary so that the available display width is not significantly exceeded, using the formula "result-width=(focus-leaf-ct*focus-col-size)+(nonfocus-leaf-ct*nonfocus-col-size)". The routine then returns at box 680.

If, however, at decision box 650 the control routine finds that focus columns are to be preferred rather than maximized, the control routine continues to box 665. At box 665 the focus column sizes are initially set so that at least the largest cell in the focus area can contain a significant amount of text. This step consists of dividing a width required to contain such text by the number of focus columns. Then the control routine moves to box 670 and then 675 to make further adjustments to both focus and non-focus column sizes. At box 670 it increases the width of the focus columns until either a reasonable amount of text can be accommodated within each focus cell, or the display width is reached. At each increase the resulting width is checked using the result-width formula given above and used in box 660. Then, at box 675, it increases the nonfocus column sizes if possible (again using the formula for result-width) until the display width is reached. The control routine then returns at box 680. Note that in this particular instantiation, only two choices, specifically whether focus columns are to be preferred or maximized, is taken into account. However, other distinctions can be made, and distinctions can be given different interpretations. For example, user defined preferences could be given for the width of focus and non-focus columns.

Figure 24:
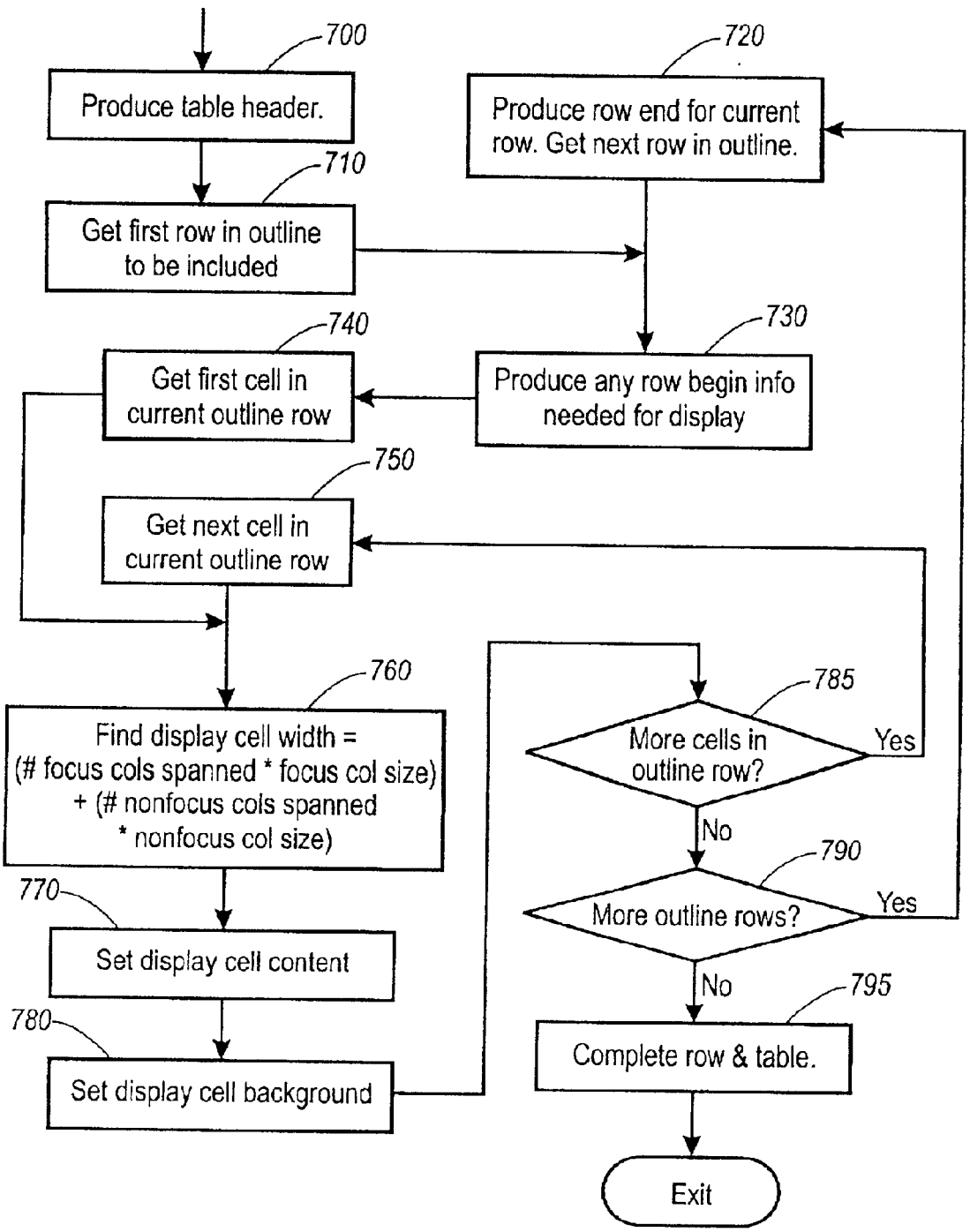
FIG. 24 is a flow diagram of the method for producing the display layout given the computed column widths.

FIG. 24, which details box 450 of FIG. 20, describes how the display layout specification is produced using the assigned column widths, content information associated with the tree nodes, and some control information. Some functional details of the layout specification depend on the intended processor of the layout. Here we generally assume a standard browser that accepts HTML table specifications; minor differences in procedure would be associated with other graphic display processors. Under this assumption, in box 700 the control routine produces the beginning of an output table specification, followed, if column number identifiers are used, by a line of invisible cells each containing a column number. (The cells are made invisible by specifying their color to be that of the background.) The rest of the processing described by the Figure consists of iterating over the rows and cells of the outline layout, producing the display layout specifications for each. The control routine obtains the first row of the outline layout in box 710, and then continues to box 730 to produce a row begin box suitable to the display processor, and then continues to box 740. At box 740 it finds the first cell of the current row in the outline layout, and continues to box 760.

At box 760 the control routine finds the actual display width of the current cell by adding the widths of the focus and nonfocus columns it spans, and then continues to box 770 (detailed in FIG. 25) to produce the actual content of the display layout specification for the cell. It then moves to box 780 (detailed in FIG. 26) to set the display cell background, and continues at decision box 785. At decision box 785 the routine checks whether there are any further cells to be processed in the current outline layout row and, if so, returns to box 750 to get the next cell. If not, it continues to decision box 790 and checks whether all rows of the outline layout have been processed. If not, it returns to box 720 to complete the display specification for the current row and get the next row. If all rows have been processed, it continues to box 795 to complete the display specification for the final row and for the table, and exits.

Figure 25:
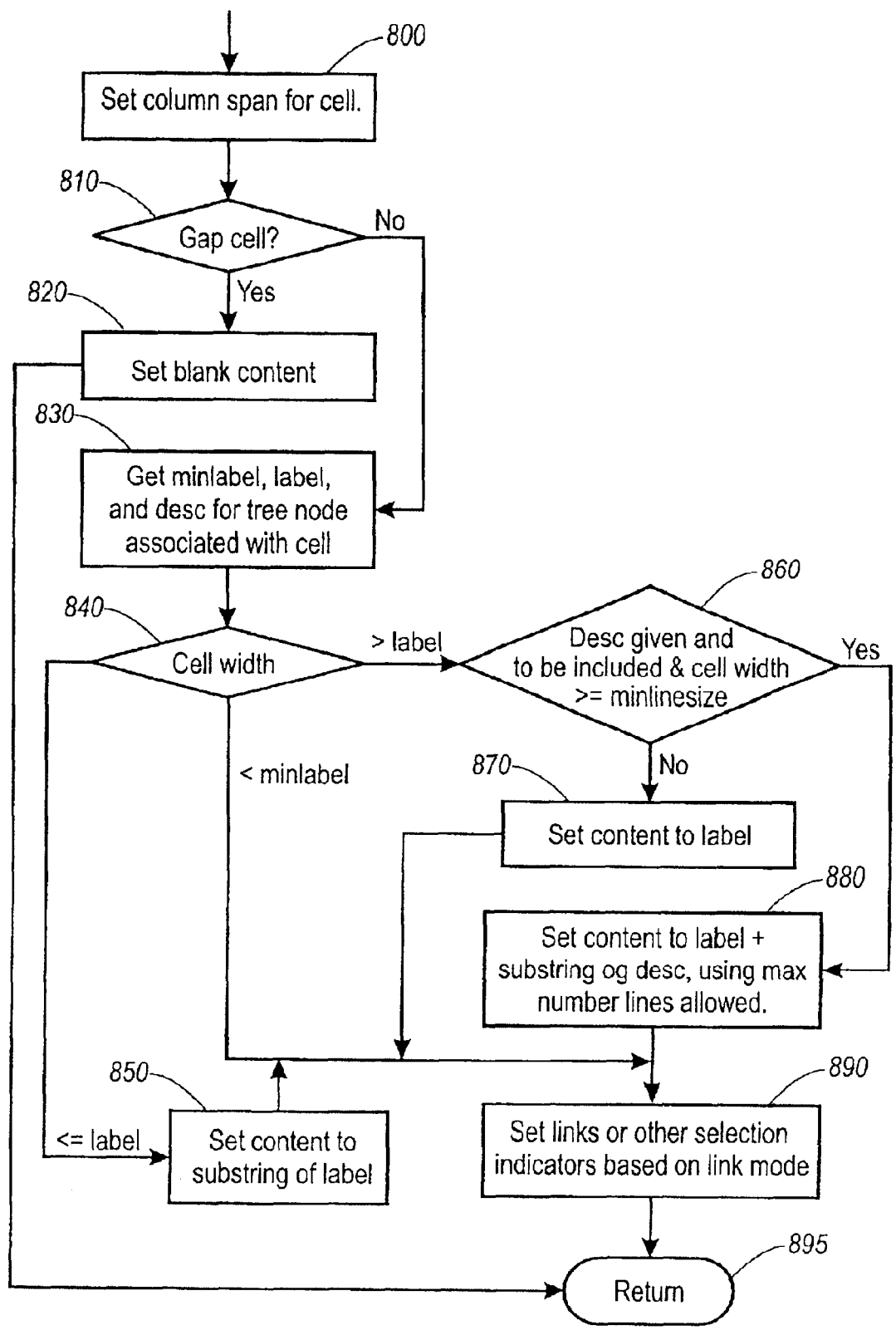
FIG. 25 is a flow diagram of the method for setting cell content based on available space.

FIG. 25, which details box 770 of FIG. 24, describes the production of display layout content for an individual cell. At box 800 the control routine gets the column span for the cell and continues to decision box 810. At decision box 810 the routine checks whether the cell is a gap cell. If so, it sets the content to blank in box 820, and returns at box 895. If the cell is not a gap cell, the routine continues to box 830, and gets the labeling and other descriptive material for the tree node associated with the layout cell. Depending on the application, there may be both a minimum-size label and a full-size label, the two may be conflated, and/or there may or may not be a separate description. Furthermore, the description may be derived from the information associated with the tree node or it may consist of the information associated with the tree node in an unmodified form. After obtaining this information, the control routine continues to decision box 840.

At decision box 840 of FIG. 25 the control routine begins the determination of how much text will be placed in the cell by comparing the effective cell width to the labeling information. If it finds that the cell is narrower than the minimum-size label, it continues at box 890 (implying that the cell will contain only a link, requiring only a single character). If it finds that the cell is wider than the minimum-size label, but at most as wide as a full label, it sets the cell content to the largest substring of the label that can be accommodated, and continues at box 890. However if, at decision box 840, the control routine finds that the cell width is greater than needed for the label, it continues to decision box 860 for further checking.

At decision box 860 of FIG. 25 the control routine checks whether descriptive text or other information associated with the node as discussed hereinabove should be included, specifically whether (a) there is descriptive material for the cell, and (b) whether the cell width is at least equal to a minimum width needed to provide the information in a useful size, and finally (c) whether the controls indicate that such information is to be included. With respect to the controls settings, while the width of a cell may be sufficient for the inclusion of information, some controls may preclude its inclusion. For example, in the expression of controls shown in FIGS. 1 through 15, the size choices "small" and "mini" preclude information. Also, in this embodiment, the choice "focus+" precludes information from non-focus areas.

If, at decision box 860, the control routine finds that information is not to be included, it proceeds to box 870 where it sets the content of the cell to the label only, and then continues at box 890. However if at decision box 860 the control routine finds that text is to be included, the routine proceeds to box 880 where it sets the content of the cell to that portion of the information that can accommodated within the allocated width and depth. The depth may vary depending on focus considerations. For example, in this instantiation, the choice "focus+" implies the use of deeper focus cells which can accordingly accommodate more information.

Box 890 is entered after the visible content of the cell is established; to set links or other mechanisms used to indicate cell selection on the display produced. The expression of these links is determined by the display processor configuration and the language used in the display specifications. For example, in a stateless browser configuration not employing forms, the links might include not only an indication of the cell row and initial column, but also the state of all other controls. Also, if in such a configuration the controls have enabled the production of an auxiliary reading view, a compound link might be set, so that when the cell is selected both a revised treetable is requested as well as the reading view. After any necessary link information is set, a return is made at box 895.

Figure 26:
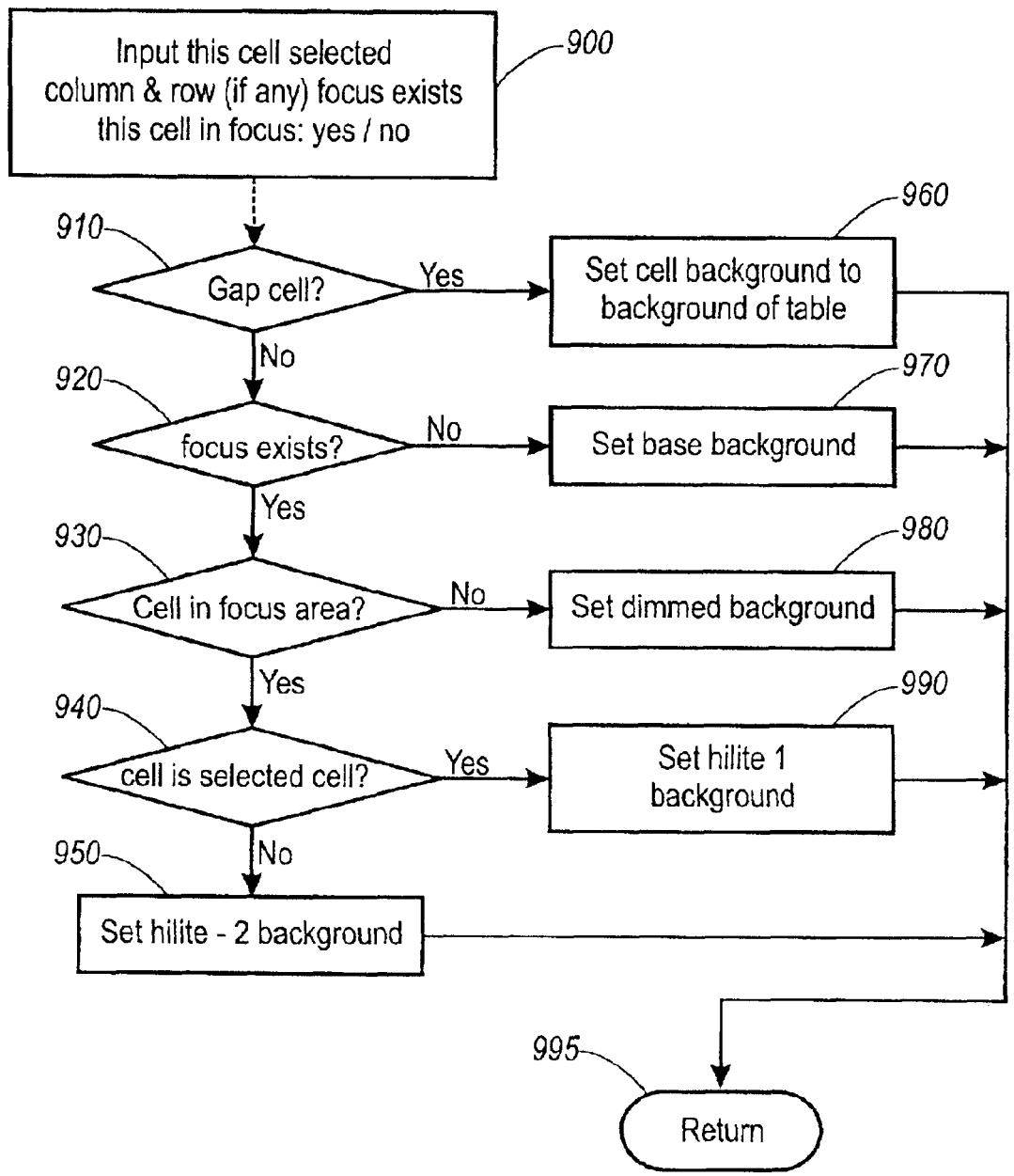
FIG. 26 is a flow diagram of the method for setting cell highlighting.

FIG. 26, detailing box 780 of FIG. 24, describes the setting of the cell backgrounds. It is exemplary only and other methods might also be used. Box 900 indicates the input, consisting of the current cell, the row and initial column of the selected cell if any, whether a focus exists and, if so, whether the current cell is in the focus area. In the methods implemented by this figure, if there is no focus, all cells, except for gap cells, are given the same background. If there is a focus, cells not in the focus area are given a dimmed background, the selected cell, if any, is given a highlight background, and other cells in the focus area are given another highlight background. Color or gray scale or other types of backgrounds can be used for highlighting and dimming, as well as reverse video and border selections with the appropriate modifications to the method.

At decision box 910 the control routine checks whether the cell is a gap cell and, if so, it continues at box 960 where it sets the cell background so that the cell is invisible, that is, so it appears to be part of the area surrounding the treetable, and then returns at box 995. If the cell is not a gap cell, the control routine continues to decision box 920 where it checks whether the treetable has any focus area. If the treetable does not have a focus area, the routine continues at box 970 where it sets the cell background to a base background, by color or other means, and then returns at box 995. If, however, the check at decision box 920 indicates that the treetable does have a focus area, the control routine continues to decision box 930 where it checks whether the current cell is in the focus area. If the current cell is not in the focus area, the control routine continues to box 980 where it sets the cell background to a dim background, using color or other means, and then returns at box 995. If, however, the check at decision box 930 indicates that the cell is in the focus area, the control routine continues to decision box 940 to check whether the current cell is the selected cell. If the current cell is the selected cell, the control routine continues to box 990 where it sets the cell background to the first highlight background by specifying a color or other type of highlight background, and then returns at box 995. If the check at decision box 930 indicates that the current cell is not the selected cell, the control routine continues to box 950, where it sets the cell color to the second highlight, and then returns at box 995.

Figure 27:
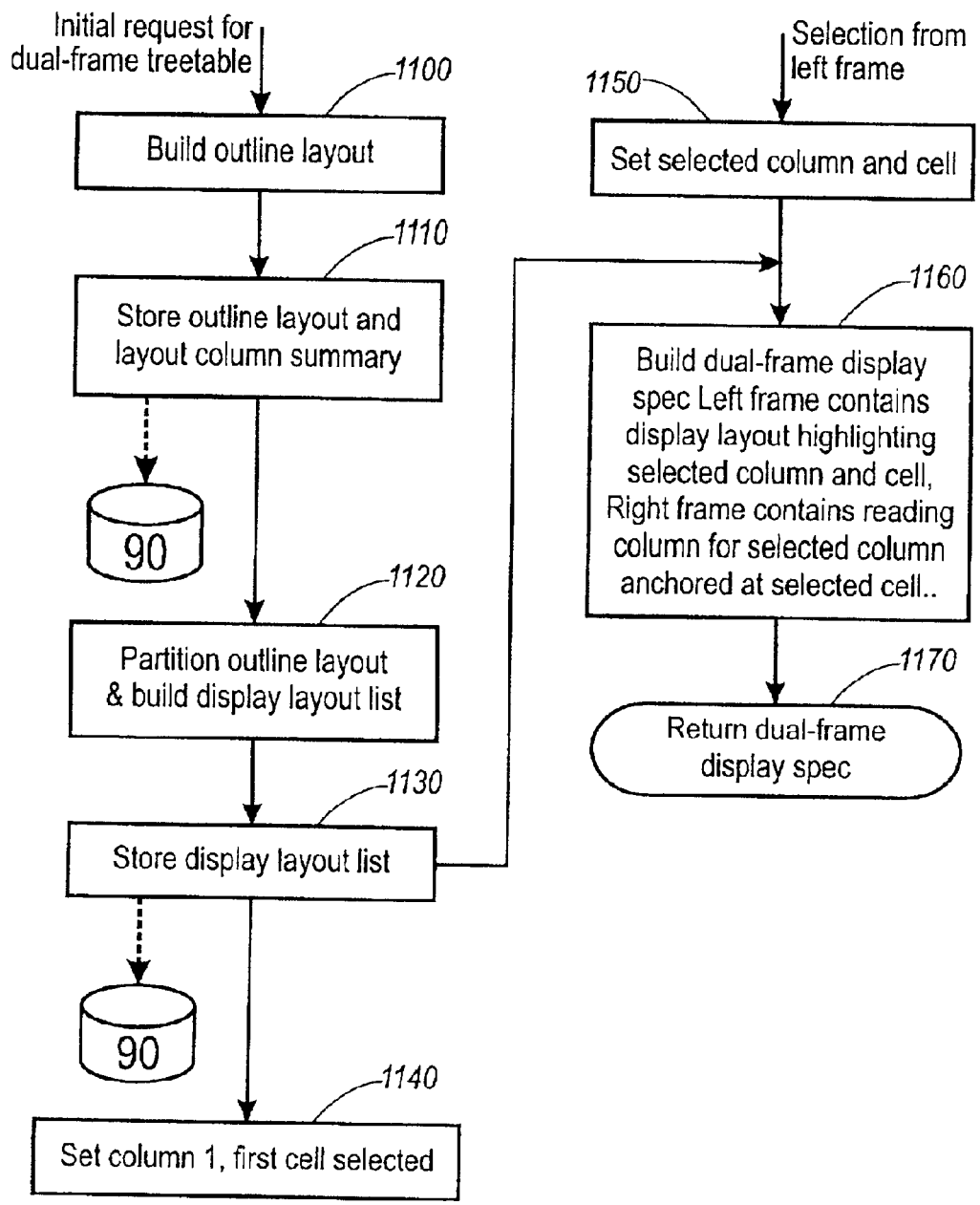
FIG. 27 is a flow diagram of the method for building dual-frame treetable displays.
Figure 28:
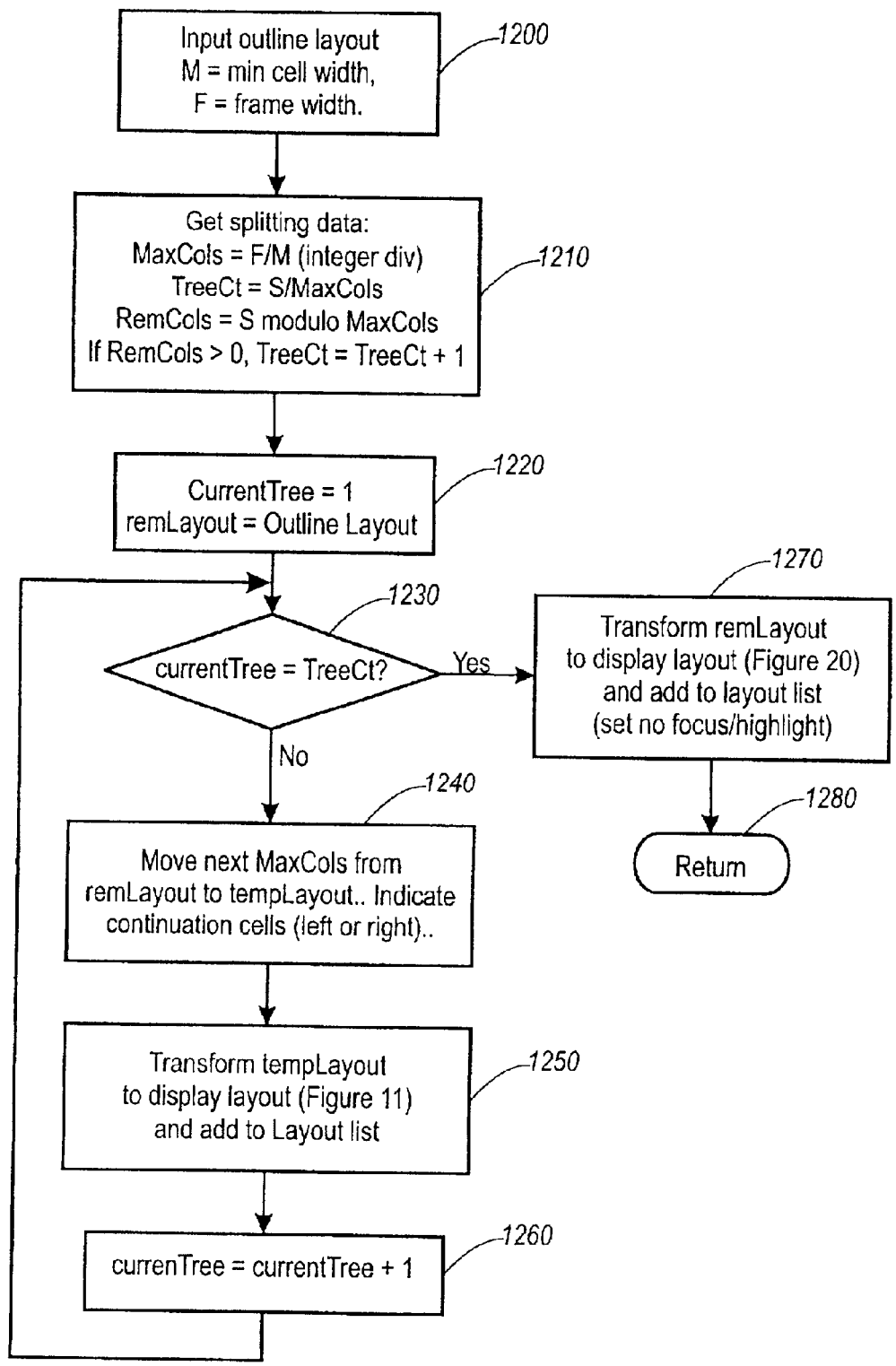
FIG. 28 is a flow diagram of the method for building a display layout list for a dual-frame treetable display.
Figure 29:
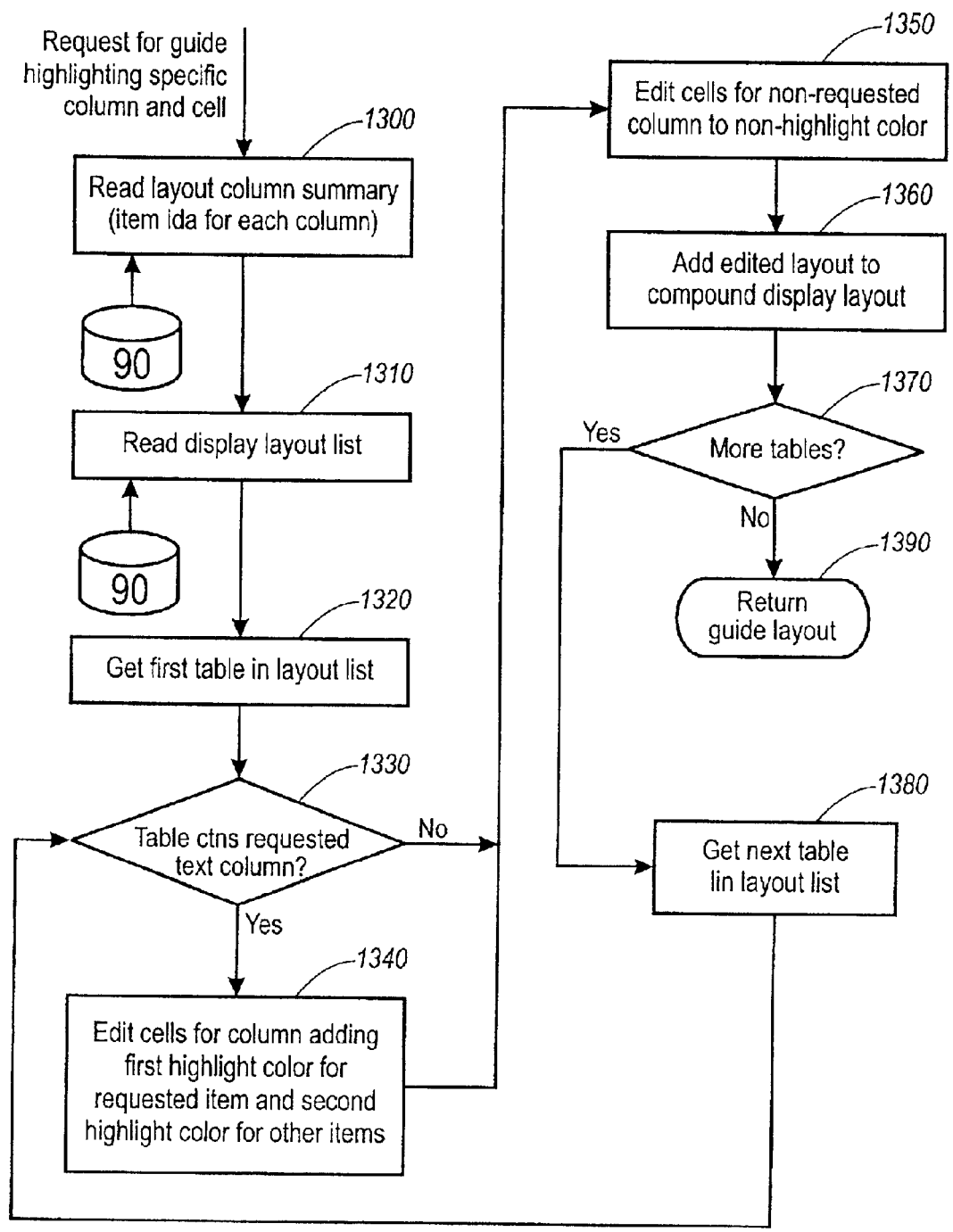
FIG. 29 is a flow diagram of the method for building a vertically partitioned treetable from a display layout list.

FIGS. 27 through 29 describe the mechanisms for producing dual-frame treetables, illustrated in FIGS. 13 through 15, in which the left-hand frames contain an outline treetable, often partitioned vertically, and the right-hand frames contain the content of a selected column. These are appropriate where reading views are desired, but only one window is to be devoted to treetable exploration.

Some details of the mechanisms are based on the assumption of a standard browser that accepts specifications of one or more frames within a display window, each referencing a separate, possibly procedural, specification of how the frame is to be obtained. Small adaptations would make the mechanism suitable for other display processors.

FIG. 27 describes the overall process used to produce both an initial dual-frame view, and subsequent views based on selections within the left-hand treetable guide. To produce an initial view, a partitioned display layout is built for the treetable guide. To produce a subsequent view, the partitioned display layout is edited to show shifting focus areas via highlighting. Thus, for producing an initial view, the control routine enters at box 1100, where it builds an outline layout. The procedure for doing this is described in more detail in FIG. 18 hereinabove. The control routine then continues to box 1110 where it stores the outline layout information for subsequent use in storage device 90, as well as a list of the node identifiers for the cells of each column, and continues to box 1120. At box 1120 the control routine partitions the outline layout into vertical slices if necessary, and builds a list of display layouts, one per slice. This process is described in more detail with respect to FIG. 28. The routine then continues to box 1130 where it stores the display layout list for future use in storage device 90. It then moves to box 1140, where it sets the initially selected column to one, and the initially selected cell to the first in that column, and continues to box 1160.

Box 1150 is the entry point used for revising the framed view after a selection has been made within the treetable guide. At box 1150 the control routine sets the selected column and cell within that column based on input parameters, and continues to box 1160. At box 1160 the dual frame layout specification is produced. The assumption of a standard browser is used here to invoke the required processing by building a framed view specifying different procedural sources for the individual frames. For the left hand frame, the procedural source specified builds a vertically partitioned treetable. The procedure is described hereinafter with respect to FIG. 29. For the right-hand frame, the procedural source specified builds a reading view. This procedure is described hereinafter with respect to FIG. 30. After the framed view is built, it is submitted to the display processor in box 1170.

FIG. 28 details the processing of box 1120 of FIG. 27 in which a display layout list is produced. Each element of the display layout list represents a vertical slice of an input outline layout. The overall process consists of: (a) determining whether the treetable must be partitioned to fit into the available space, (b) if so, how many components are needed, and then (c) iteratively splitting each component from the input outline and converting it to a display layout. Input to the procedure is outlined in box 1200, consisting of the outline layout, together with the available frame width, and a minimum display cell width. The control routine is entered at box 1210 where it computes the basic data needed to decide whether the treetable must be split vertically to fit into the frame. The computed data consists of the number of minimum-width columns (maxCols) that can fit into the horizontal dimension of the frame, and then finding the number of tree partitions needed to accommodate all columns. The control routine then continues to box 1220 to initialize processing by setting the current table to 1 (current tree), and the current "remainder layout" (remLayout) to the full outline layout. In the rest of the processing, table partitions are separated from remLayout one by one and converted to display form. This begins at decision box 1230 where a check is made as to whether the next component to be generated is the last one. If the current table is not the last, the control routine continues at box 1240, where a temporary outline layout (tempLayout) is constructed consisting of the next maxCols columns of remLayout, those columns are removed from remLayout, and the control routine continues to box 1250. At box 1250 the routine transforms the tempLayout to a display layout, and adds the result to the display layout list. The transformation of an outline layout (such as the tempLayout) to a display layout is described in detail hereinabove with respect to FIG. 20. After adding the display layout to the display layout list, the routine continues to box 1260 to increment the current tree number and return to box 1230.

If, however, the test at decision box 1230 determines that the current component to be generated is the last one, the control routine continues to box 1270 where the remaining columns, those in remLayout, are transformed to a display layout, the result is added to the display layout list, and the control routine returns at box 1280.

FIG. 29 describes the procedure for producing a vertically partitioned treetable layout from the display layout list obtained in the procedure of FIG. 28. Its purpose is to set the backgrounds of cells or other highlight parameter in the layouts of the list to indicate the in-focus column and cell, and to concatenate the layouts. It is entered based on a request to produce a new guide frame, either for the initial display of the guide frame, or for a subsequent display based on a change in the selected column and/or cell. Beginning at box 1300, the control routine reads the stored column information from storage device 90. The stored column information consists of lists of column numbers and item identifiers associated with each column. The control routine continues to box 1310 where it reads the stored display layout list from storage device 90. It then continues to box 1320 to get the first table layout in the list, and continues to box 1330. At decision box 1330 the control routine checks whether the current table layout contains the selected column. If it does, the routine continues to box 1340 to set a background specification for those cells in the layout representing cells in the requested column to either a first highlight background (for the selected cell in the column) or a second highlight background (for non-selected cells in the column) and continues to box 1350. Backgrounds are distinguished using color or other means depending on the application as described hereinabove.

If, however, the test at box 1330 indicates that the current table does not contain the requested column, the control routine goes directly to box 1350. At box 1350 the control routine sets the background for cells not in the selected column to the non-highlight background, and continues to box 1360. At box 1360 the edited layout is used to begin, or to extend, the final layout, and the control routine continues to box 1370. At decision box 1370 the existence of additional table layouts in the collection is checked. If there are more layouts, the control routine continues to box 1380 to get the next layout, and returns to box 1330 to generate the next layout. If not, the control routine continues to box 1390 to return the completed partitioned layout.

Figure 30:
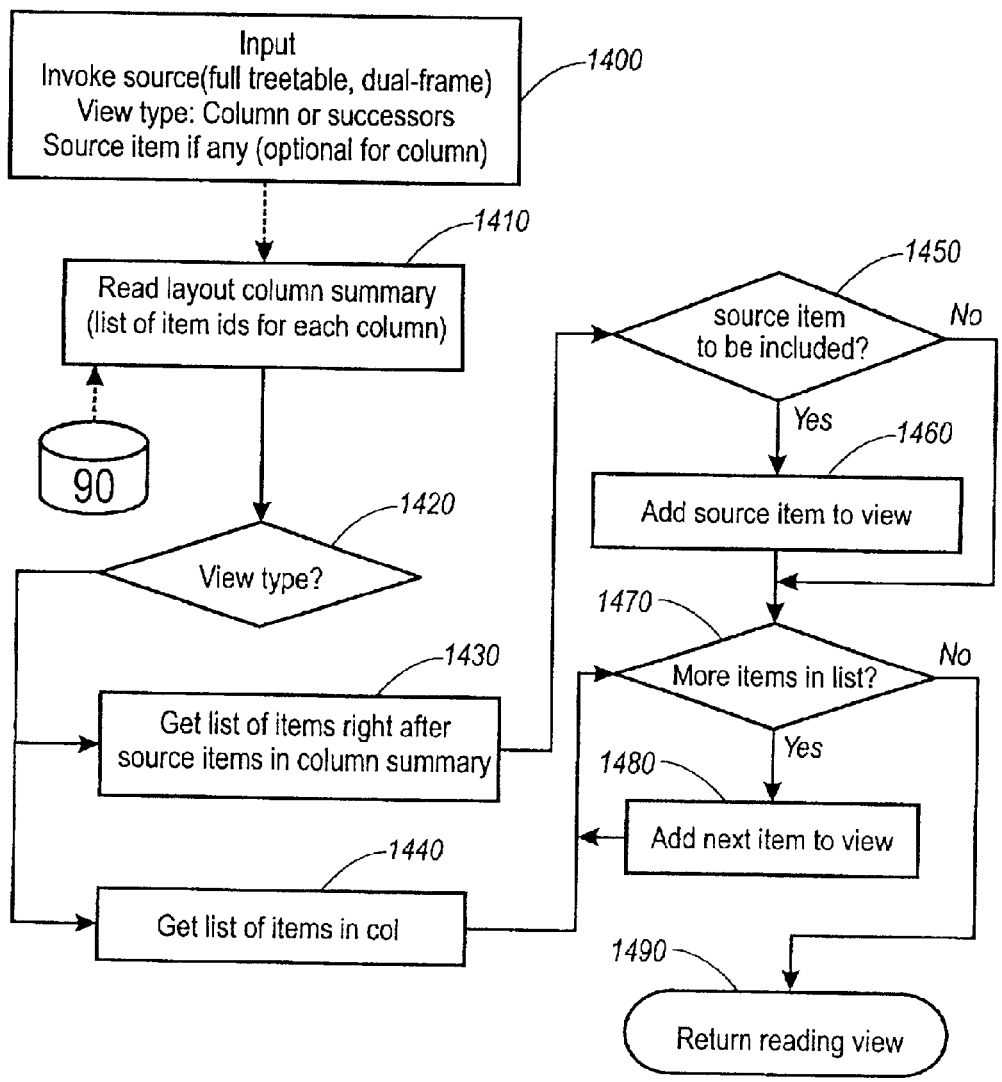
FIG. 30 is a flow diagram of the method for producing an auxiliary column or successors reading view.

FIG. 30 describes the procedure for producing a reading view, either as part of a dual-frame treetable, or as a separate window. Box 1400 outlines the inputs to the procedure, consisting of an indication of the invocation source (a selection either from a full treetable or the from the navigation guide of a dual-frame treetable), the type of reading view (a column or a set of successors), and a source item if any (a cell selection). The control routine enters at box 1410, where it reads the stored column summary information from storage device 90, which is derived from the outline layout, and consists of lists of item identifiers for cells in each column. The control routine then moves to decision box 1420, where it checks whether the view to be generated is of a column or a set of successors.

If the view to be generated is a "successors" view, the control routine continues to box 1430, where it produces an output list consisting of identifiers of items immediately following the source item in the column summary information lists, and continues to box 1450. At decision box 1450 the control routine checks whether the source item is to be included in the output view. This may depend on the invocation source. For example, if the invocation source is a full treetable, the source item may be included in the reading view, but if the invocation source is a framed navigation guide, it may not be. If the source item is to be included in the view, the control routine continues to box 1460 where it adds the content representing the source item to the view, and continues to box 1470. The procedure for adding the content is described in more detail hereinafter with respect to FIG. 31. Otherwise the control routine proceeds directly to box 1470.

If, however, the check at decision box 1420 indicates that the view to be produced is a "column" view, the control routine continues to box 1440 where it produces an output list consisting of item identifiers for the column from the column summary list, and continues to box 1470.

Boxes 1470 and 1480 represent a loop producing one component of the reading view for each item identifier in the output list. At decision box 1470 the control routine determines whether there are any more items in the output list. If so, it continues to box 1480 where it adds the content representing the source item to the view, using a procedure described in more detail hereinafter with respect to FIG. 31, and returns to box 1470. However, if the check at box 1470 indicates that there are no more items in the output list, the control routine returns the reading view at box 1490. It should be noted that, in this procedure, the content of each item is added as a separate unit. For some applications it may be useful to provide summary information in addition to, or instead of, the items of the view.

Figure 31:
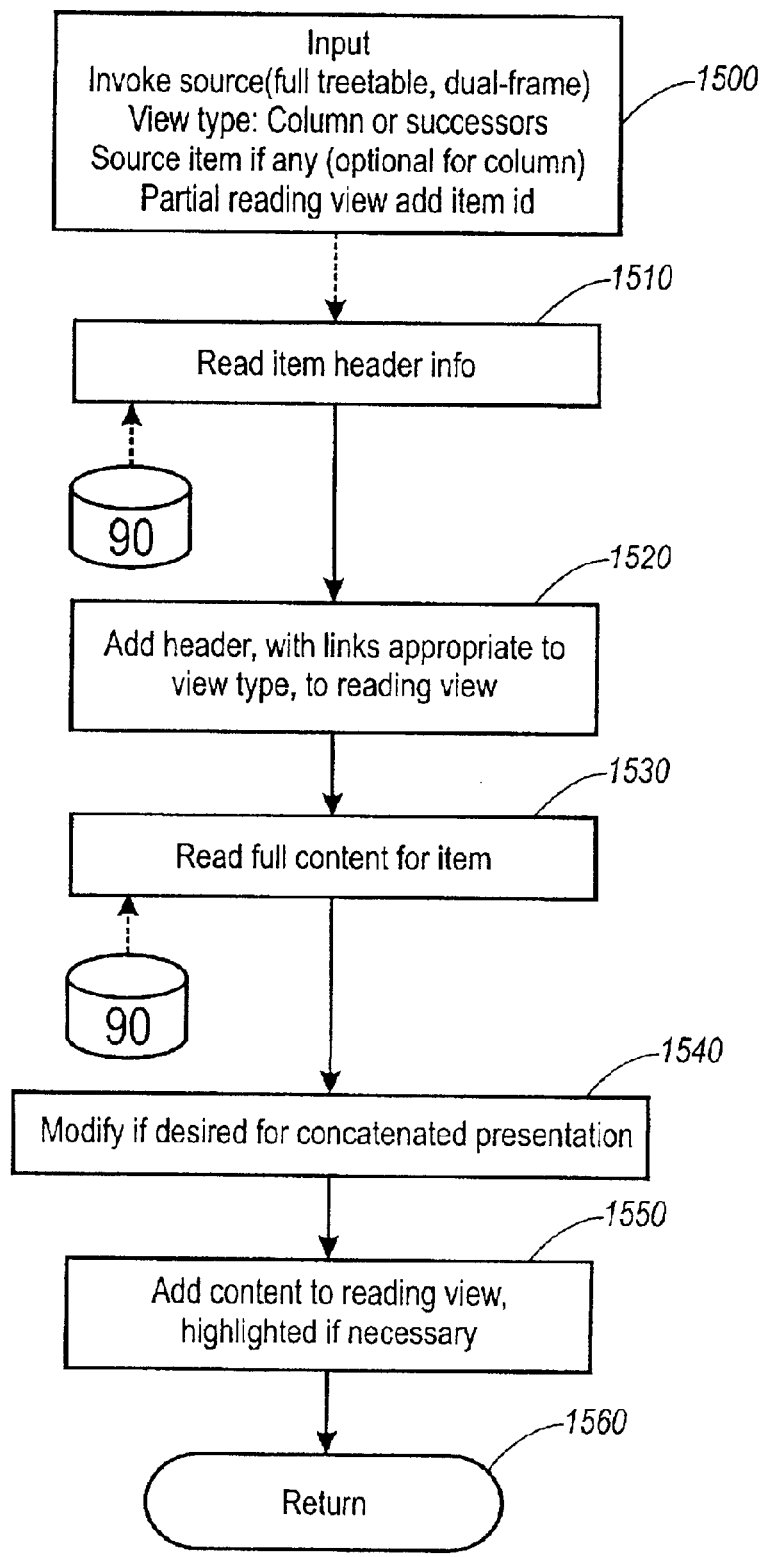
FIG. 31 is a flow diagram of the method for adding the content associated with a particular node to a reading view.

FIG. 31 describes a procedure for producing a single reading view item. Box 1500 outlines the input to the procedure: the invocation source (a full treetable or a dual-frame guide), the view type (column or successors), the source item if given, the partial reading view under construction, and the id of the item to be added to the view. The control routine enters at box 1510 where it reads item header information from storage box 90 and continues to box 1520 where it adds header information for the item to be added to the reading view. The format of the header information and the links included may differ based on the invocation source. After adding the header information, the control routine continues to box 1530 where it retrieves the full content of the item and continues to box 1540. At box 1540 it makes any adjustments to the content for placement within a concatenated reading view (e.g., eliminating quoted messages from views of email threads when the message quoted is the predecessor), and continues to box 1550. At box 1550 the control routine highlights the content if it is the source item of a column view, and adds the content to the reading view, and then returns at box 1560.

What is claimed is:

1. A computing system for generating display specifications for displaying tree-structured information having a multiplicity of nodes connected by directed edges wherein any node has at most one incoming edge, a node with no incoming edges is a root node, a node with no outgoing edges is a leaf node and a path is a series of nodes starting from any node and at each point proceeding along a directed edge in that direction to another node, a subtree is a portion of the nodes starting at any node and including all the nodes on all possible paths therefrom, wherein each node has associated information, on a display, said computing system comprising:

a) input means for receiving user input, and
   b) computing means responsive to said input means capable of generating display specifications for producing an image of the tree structured information when received by a display processor, the image comprising a two-dimensional row and column arrangement of cells having a display area, wherein each node is associated with a cell, said arrangement having a number of rows equal to the number of nodes in the longest path and a number of columns equal to the number of leaf nodes wherein:
      i) a root node associated cell is placed in a first row,
      ii) node associated cells along a path from the root to a leaf are placed in series in consecutive rows from the first row wherein each node associated cell spans the greater of one column or the number of columns equal to the number of leaf nodes which are located on paths from the node associated with the node associated cell, iii) each column represents a path from the root to a leaf, and all such paths are represented, and iv) each node associated cell contains at least one selection element, and c) output means responsive to said computing means for sending the display specifications to a display processor.

2. The computing system of claim 1 further comprising a display responsive to said output means for displaying the image.

3. The computing system of claim 1 wherein the user input indicates a focus selection and the computing means further generates a display specification such that the cells within the focus selection are visually different from the rest of the cells.

4. The computing system of claim 3 wherein the focus selection is a column selection.

5. The computing system of claim 3 wherein the focus selection is a subtree selection.

6. The computing system of claim 3 wherein the visual difference comprises the columns within the focus selection being larger than the columns outside the focus selection.

7. The computing system of claim 3 wherein each cell has a color and the visual difference comprises the color of the cells within the focus selection being different from the color of the cells outside the focus selection.

8. The computing system of claim 1 wherein the user input indicates a column selection and the computing means further generates a display specification such that the cells within the column selection are visually different from the rest of the cells.

9. The computing system of claim 8 wherein the visual difference comprises the columns within the focus selection being larger than the columns outside the focus selection.

10. The computing system of claim 9 wherein the user input further indicates a cell selection and the computing means further generates a display specification such that the selected cell is visually different from both the column selection cells and the rest of the cells.

11. The computing system of claim 1 wherein the user input indicates a subtree selection and the computing means further generates a display specification such that the cells within the subtree selection are visually different from the rest of the cells.

12. The computing system of claim 11 wherein the user input further indicates a cell selection and the computing means further generates a display specification such that the selected cell is visually different from both the subtree selection cells and the rest of the cells.

13. The computing system of claim 1 wherein the user input indicates a cell selection and the computing means further generates a display specification such that the selected cell is visually different from the rest of the cells.

14. The computing system of claim 1 wherein the user input indicates a column selection and the computing means further generates a display specification such that only those cells within the column selection will be displayed.

15. The computing system of claim 14 wherein the column selection indicates a portion of the columns.

16. The computing system of claim 14 wherein the column selection indicates all of the columns.

17. The computing system of claim 1 wherein the user input indicates a subtree selection and the computing means further generates a display specification such that only those cells within the subtree selection are displayed.

18. The computing system of claim 1 wherein the user input indicates a size selection and the computing means further generates a display specification such that the display area is changed.

19. The computing system of claim 18 wherein the display area is made larger.

20. The computing system of claim 18 wherein the display area is made smaller.

21. The computing system of claim 1 wherein the user input indicates a reading selection and the computing means further generates a display specification such that a reading view of the information associated with the nodes associated with the cells in the reading selection is displayed.

22. The computing system of claim 21 wherein the information is presented in a sequential, concatenated format.

23. The computing system of claim 21 wherein the information is reduced to essential content.

24. The computing system of claim 23 wherein the information is reduced to the essential content necessary for comprehension of the reading selection.

25. The computing system of claim 21 wherein the reading selection comprises a column selection.

26. The computing system of claim 21 wherein the reading selection comprises a selection of the nodes immediately succeeding a given node on all paths which include the given node.

27. The computing system of claim 21 wherein the reading selection comprises a selection of nodes consisting of a given node and all nodes immediately succeeding the given node on all paths which include the given node.

28. The computing system of claim 21 wherein the reading view is displayed in the same display area previously occupied by the image of the tree-structured information.

29. The computing system of claim 21 wherein the reading view is displayed in a different display area from the image of the tree-structured information.

30. The computing system of claim 21 wherein the reading view shares the display area with the tree structured information.

31. The computing system of claim 1 wherein at least one cell is populated with at least some of the information associated with the node associated with the cell.

32. A computing system for generating display specifications for displaying hierarchical information, where the information can be represented as a set of nodes wherein each node is associated with a portion of the information and the nodes are connected by directed edges wherein each node has at most one incoming edge, a parent node is the source of an incoming edge, a child node is the target of an outgoing edge, a root node is a node with no incoming edge, a leaf node is a node without any outgoing edges, a path is a series of nodes starting from one node, and at each point proceeding along a directed edge in that direction to another node until the end of the path is reached, wherein a full path is a path from a root node ending at a leaf node, in a two-dimensional structure having a plurality of rows, each row having a height, and a plurality of columns, each column having a width, said computing system comprising:

A) input means for receiving user input, and

B) computing means responsive to said input means capable of generating display specifications for producing an image of the hierarchical information when received by a display processor, the image comprising:

i) a two-dimensional structure for containing cells associated with each node wherein the number of the plurality of rows equals the number of the nodes in the longest path, and the number of the plurality of columns equals the total number of the leaf nodes, and a cell associated with a parent node is a parent cell, a cell associated with a child node is a child cell, and a cell associated with a leaf node is a leaf cell, wherein
   a) each of the cells is placed in a row n within the two-dimensional structure such that the parent cells of each cell are placed in a row n−1,
   b) child cells of each cell are placed in a row n+1,
   c) leaf cells span exactly one column,
   d) cells other than leaf cells span exactly the columns spanned by the child cells associated with that cell, and
   e) each cell contains a selection element, and
C) output means responsive to said computing means for sending the display specifications to a display processor.

33. A computing system for generating display specifications for displaying hierarchical information, where the information can be represented as a set of nodes wherein each node is associated with a portion of the information and the nodes are connected by directed edges wherein each node has at most one incoming edge, a parent node is the source of an incoming edge, a child node is the target of an outgoing edge, a root node is a node with no incoming edge, a leaf node is a node with no outgoing edges, and a path is a series of nodes starting from one node, and at each point proceeding along a directed edge in that direction to another node until the end of the path is reached, wherein a full path is a path from a root node ending at a leaf node, in a display image having a plurality of rows, each row having a height, and a plurality of columns, each column having a width, said computing system comprising:
   A) input means for receiving user input, and
   B) computing means responsive to said input means capable of generating display specifications for producing an image of the hierarchical information when received by a display processor, the image comprising:
      i) a two-dimensional structure for containing cells associated with each node wherein the number of the plurality of rows equals the number of the nodes in the longest path, and the number of the plurality of columns equals the total number of the leaf nodes, and a cell associated with a parent node is a parent cell, a cell associated with a child node is a child cell, and a cell associated with a leaf node is a leaf cell, wherein
         a) each node has a span value where the span value is the number of leaf nodes that are on paths that include the node,
         b) the root cell is located in the first row and spans all of the columns of the first row of the display image,
         c) child cells are located in consecutive rows of the display image for each child node of each parent node in the previous row where each child node spans the number of columns equal to its span value and is placed to span at least a portion of the same columns spanned by its parent cell,
         d) cells other than leaf cells span exactly the columns spanned by the child cells associated with that cell,
         e) leaf cells span one column, and
         f) each cell contains at least one selection element , and
C) output means responsive to said computing means for sending the display specifications to a display processor.

* * * * *